United States Patent [19]

Andrews et al.

[11] Patent Number: 4,864,410
[45] Date of Patent: Sep. 5, 1989

[54] APPARATUS AND METHOD OF MAKING PHOTOGRAPHS FROM A VIDEO IMAGE

[75] Inventors: Linda Andrews; Michael Brewer, both of Felton; Arthur Vassiladis, Mountain View, all of Calif.

[73] Assignee: Bally Manufacturing Corporation, Chicago, Ill.

[21] Appl. No.: 892,498

[22] Filed: Aug. 1, 1986

[51] Int. Cl.[4] ................. H04N 1/387; H04N 5/262; H04N 7/18
[52] U.S. Cl. ......................... 358/443; 358/22; 358/93; 358/183; 358/302; 358/909; 364/226.1
[58] Field of Search .............. 358/256, 296, 302, 183, 358/22, 93, 97, 909

[56] References Cited

U.S. PATENT DOCUMENTS

| | | |
|---|---|---|
| 1,951,038 | 3/1934 | Pask . |
| 2,473,280 | 6/1949 | Dart et al. . |
| 3,047,654 | 7/1962 | Cornberg ............... 358/93 |
| 3,343,173 | 9/1967 | Cooley ................... 358/304 |
| 3,818,496 | 6/1974 | Lee ........................ 354/75 |
| 4,130,834 | 12/1978 | Mender et al. ........ 358/127 |
| 4,273,024 | 10/1979 | Miller .................... 358/93 |
| 4,276,570 | 6/1981 | Burson ................... 358/93 |
| 4,297,724 | 10/1981 | Masuda et al. ........ 358/93 |
| 4,381,547 | 4/1983 | Ejiri ....................... 382/47 |
| 4,407,347 | 8/1984 | Moloomian ............. 358/93 |
| 4,413,277 | 11/1984 | Murray .................. 358/93 |
| 4,491,868 | 1/1985 | Berridge ................ 358/139 |
| 4,651,200 | 3/1987 | Ledley ................... 358/93 |
| 4,654,487 | 6/1987 | Newmuis ................ 382/2 |
| 4,670,781 | 6/1987 | Aubert ................... 358/107 |
| 4,677,470 | 6/1987 | Cooper .................. 358/98 |
| 4,710,821 | 12/1987 | Ohta ...................... 358/256 |
| 4,714,957 | 12/1987 | Takano .................. 358/93 |
| 4,738,526 | 4/1988 | Larish ................... 354/412 |
| 4,864,410 | 3/1987 | Suzaki ................... 358/93 |

*Primary Examiner*—Tommy P. Chin
*Attorney, Agent, or Firm*—Douglas A. Chaikin

[57] ABSTRACT

An apparatus for making photographs from a video image including a video system for creating the video image and for displaying the video image to the subject, a photographic system for producing a photograph from the video image, and a computer for transferring the video image from the video system to the photographic system. The computer system digitizes the video image signal from the video system, stores it in a digitized format and converts it to an analog signal for display by the video system and for producing photographs by the photographic system. And a method of producing photographs from a video image using the above apparatus.

41 Claims, 7 Drawing Sheets

4,864,410

APPARATUS AND METHOD OF MAKING PHOTOGRAPHS FROM A VIDEO IMAGE

FIELD OF THE INVENTION

This invention relates to entertainment devices in the field of video equipment and more particularly to entertainment devices which employ a combination of video equipment and computers to create photographs.

PRIOR ART

Since the early days of modern photography, there have been photographic facilities in public places. Most especially such facilities became popular in places where people were relaxing or on holiday. In the early days, individual photographers set up their equipment in amusement centers, or other places where people were assembled, to create momentos of the occasion. In many parts of the world, a remnant of this phenomenon continues with the paparazzo or surprise sidewalk photographer. The paparazzo takes photographs of vacationers and offers his work to his patrons. The patrons may purchase the work or the paparazzo can sell the photographs to others, such as the news media.

In order to take advantage of the public's continuing interest in such photographs, automated photographic booths have been developed. Such booths produce small memento photographs. Photo-booths are popular at amusement parks, carnivals and the like. However, despite technological advances, the photo-booth has not changed for approximately two generations.

Although photo-booths, which create instant color photographs, were attempted, in these photo-booths have largely passed from existence because the cost is too high.

The current standard photo-booths, where one can enter and take photographs of oneself, typically, create four, very small photographs of four different user poses. The film is developed using standard wet chemistry. It takes at least 2½ minutes to give the photographs to the user after all the posing is completed.

In the past there have been attempts at using a video image to create a photograph by use of a computer. For example, U.S. Pat. No. 4,467,349 to Maloomian is an apparatus which allows a prospective customer of articles of clothing to "try on" an article of clothing by use of a video tape recorder in conjunction with a computer. The user does not actually "try on" the clothing, rather secondary images from the computer memory are overlayed over the user's own primary image. A full figure electronic image of the user is produced by a camera. The image is sent through the computer and then displayed on a video screen. "Articles of clothing" are then presented to the user by use of the computer's permanent memory. The user then "trys on" the clothing electronically. The "trying on" of clothing is accomplished by overlaying secondary images on the video image in storage. The secondary image is distorted to suit the user. A huge amount of memory is required to provide the "clothing" from the storage and it will be noted that Maloomian does not work in real time.

Others have also tried using a video image in the fashion industry. For example, in Masuda, et al, U.S. Pat. No. 4,297,724, an apparatus is described for styling hair. A face shape is separated from a hair pattern and substitute hair patterns are formed to fit on the first face shape.

Others such as Menger et al, U.S. Pat. No. 4,130,834, have used a video camera and monitor and a video recorder to produce photographic stills from the video signal created by the video camera. And, of course, there are many camera mechanisms which produce and develop pictures from images. For example, S. J. Pask, U.S. Pat. No. 1,951,038 and Dart et al, U.S. Pat. No. 2,473,280 are examples of same.

However, there are no known devices which produce and dispense photographs and which can produce rapidly either as regular photographs or as humorous (distorted) images of the user[s face. Indeed known devices for video applications are intended for the purpose of obtaining self portraits, either regular or humorous.

Thus, there remained a need for providing a photograph from a video image, inexpensively. There further remained a need for an apparatus which could manipulate the video image to give a humorous effect to the user. The apparatus must involve the user while the photographic process is taking place by giving feedback to the user. The apparatus must, of course, attract the user initially.

SUMMARY OF THE INVENTION

It is a main object of this invention to provide an entertainment apparatus which creates photographs from a video image through the use of a computer.

It is a general object if this invention to provide an apparatus which is capable of making both normal and distorted photographs from a video imagte in a relatively inexpensive manner.

It is another object of this invention to provide an apparatus as set forth above which operates in real time and involves the user with the process of making a photograph from a video image, and allows the user to view the pose before creating the photograph of same.

It is a further object of this invention to provide the above apparatus which enables the user to have instantaneous feedback to facilitate the user in striking a desirable pose.

It is a further object of this invention to provide an apparatus which inexpensively produces humorous photographs by use of a video camera, a computer and a photographic system.

In order to produce photographs from a video image in accordance with the above objects, the following apparatus has been developed, comprising:
  video means for creating a video image signal of a user;
  computer means for receiving the video image signal from the video means, digitizing the video image signal, storing the digitized video image, converting the digital video image signal to an analog signal, and sending the analog signal; and
  photographic means for receiving the analog signal from the computer means and creating a photograph from the analog signal.

In a preferred embodiment, the apparatus includes menas for manipulating the stored image to produce a distorted photograph. One particular method employed by a preferred embodiment of the invention, comprises mirroring one half of the video image on the other half of the video image to create a symmetrical image and photograph.

In another preferred embodiment the manipulating means includes an ALU (arithmetic logic unit) which subtracts a preselected quantity from each horizontal address value to yield a further distorted photograph. A preferred method of manipulating the image to produce the further distorted photograph includes using the ALU to subtract a known quantity q from the horizontal address line during each horizontal scan.

In still another preferred embodiment, the apparatus is housed in a booth having an open section for seating of the user and a closed section for housing the apparatus. The apparatus may include power supply means in the closed section.

In still another preferred embodiment, the apparatus is capable of taking a series of photographs. In a preferred embodiment, the method making a photograph in accordance with this invention includes the step of pausing between photographs so the user can readjust his pose. The user can observe his position, in real time, through a monitor provided by the video means prior to a photograph being taken. Between photographs, the user may readjust his pose as desired.

The apparatus and method in accordance with this invention enables the user to select between a normal mode for producing normal photographs and a humorous mode for producing photographs which have been distorted.

Using the apparatus and method of this invention, the user has the further advantage of positioning himself and observing that position prior to receiving any photographs.

These and other objects and advantages of the invention will be more clearly understood with respect to the detailed description of the invention and with reference to the drawings.

DETAILED DESCRIPTION OF THE INVENTION

Figure 1:
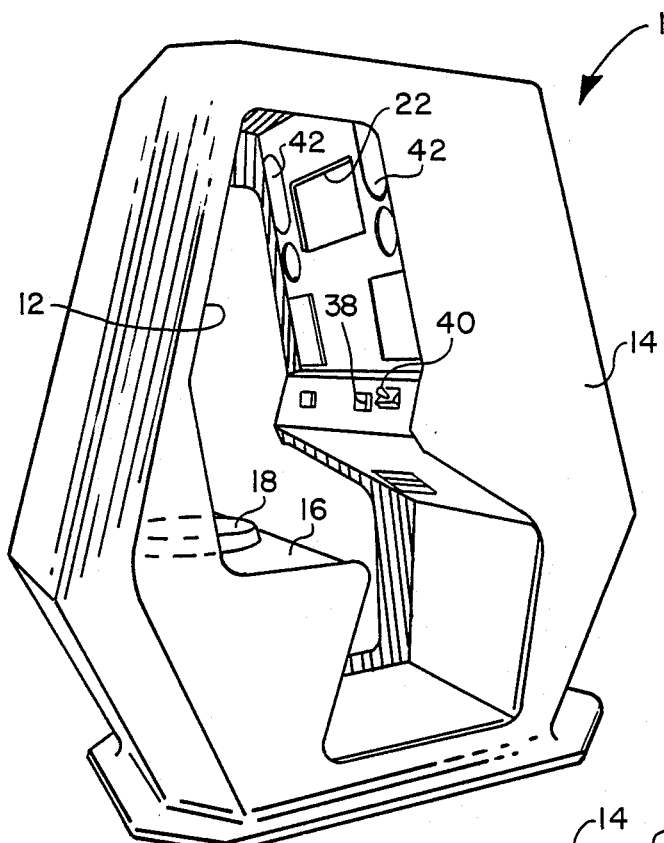
FIG. 1 illustrates a free standing booth containing the apparatus for making a photograph from a video image in accordance with this invention.
Figure 2:
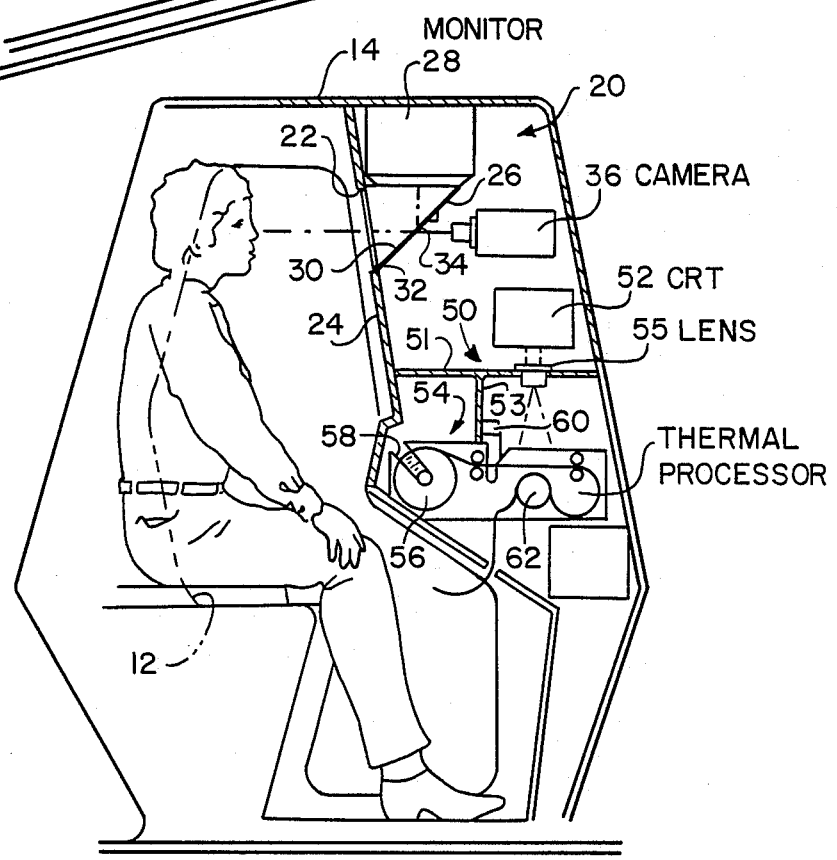
FIG. 2 is a schematic view in partial section, showing the general operations of the booth and apparatus in accordance with this invention.

The invention will now be described with reference to the drawings wherein like reference characters designate like or corresponding parts throughout the several views and referring particularly to FIG. 1, there is shown the invention, a free standing booth for making photographs from a video image, generally designated by the numeral 10. As illustrated in FIGS. 1 and 2 the booth is of sufficient size to house a user who is the subject of the photographs. Additionally, the booth 10 is of sufficient size to store the apparatus for making photographs from the video image. The booth is self-enclosed and includes an open portion 12 and a closed portion 14. The open portion includes a seat 16 and a seating cushion 18. The seating cushion acts to align the user properly with a video system 20.

The closed portion 14 of the booth 10 includes a window 22. The window 22 is mounted on a wall 24 and faces the use. A sheet 26 of clear acrylic is mounted at a 45° angle behind the window 22 such that when the user looks through the window 22 he sees the sheet 26. A CRT is mounted in the closed portion 14 above the sheet 26 and defines a display monitor 28. Light from display monitor 28 is reflected by on the sheet 26. The sheet 26 functions as a beamsplitter allowing the camera to take a "head-on" view of the user and also allowing the user to see himself on the CRT (cathode ray tube). This provides the user with feedback on his posing and allows him to adjust his pose to that which is most desirable.

The sheet 26 has a first side 30 facing the user and a second side 32 away from the user. The second side is painted black with the exception of a small center area 34. A video camera 36 is positioned behind the sheet 26 and in direct alignment with the small clear center area 34.

Thus, the sheet 26 being at approximately 45° angle with the horizontal and being painted black on the side 32 causes it to act as a mirror for providing a video image to the user. The sheet 26 could also be coated with special reflective coating to enhance the mirror effect. For improved performance, the first side 30 reflects 50% of the light and transmits 50% of the light. This has the effect, to the user, of seeing his "reflection" in the mirror. A small area center 34 allows the video camera 36 to view the user and create a video image therefrom. The camera 36 creates a video image and transfers the image to the computer. The computer processes the image and sends it back to the display monitor 28.

In reality, the user sees himself on the display monitor 28, only after it has been processed by a computer system (not shown). Thus, the image on the display monitor 28 is not a direct reflection. Using this method, the video image data is stored in the computer, where it may be manipulated and then returned to the display monitor 28.

The closed portion 14 also includes a coin acceptance device 38 which accepts coins and when a predetermined amount is reached, it sends a signal to the computer system which then activates the apparatus.

The closed portion 14 of the booth 10 also provides a switch 40 which, upon activation of the apparatus, gives the user a choice of creating either normal or distorted photographs.

The apparatus also provides for interaction with the user to keep the user involved during the process and to attract his attention, initially. The closed portion of the booth includes speakers 42 which can both entertain and communicate with the user.

With particular reference to FIG. 2, there is shown the closed portion 14 of the booth 10 having a black and white photographic system 50 for producing black and white photographs. The photographic system 50 includes a second CRT defining an exposure monitor 52, a lens 55 and a photo-paper system 54. The photographic system 50 is in a light tight container. Internal walls 51 and 53 shield photo-sensitive paper from the light internal the booth and from the light produced upon activation of the exposure monitor 52. The paper system 54 includes a roll of photo-sensitive paper 56 held in a paper drive mechanism 58 which feeds the paper 56 through the system 54 upon command by the computer system. The paper system 54 further includes a paper cutter 60 which cuts the paper 56 at the appropriate time upon a signal from the computer system. The photographic system 50 further includes a thermal processor 62 which develops the photographic paper 56. After developing the cut paper 56, the photographs may be removed by the user.

Figure 3:
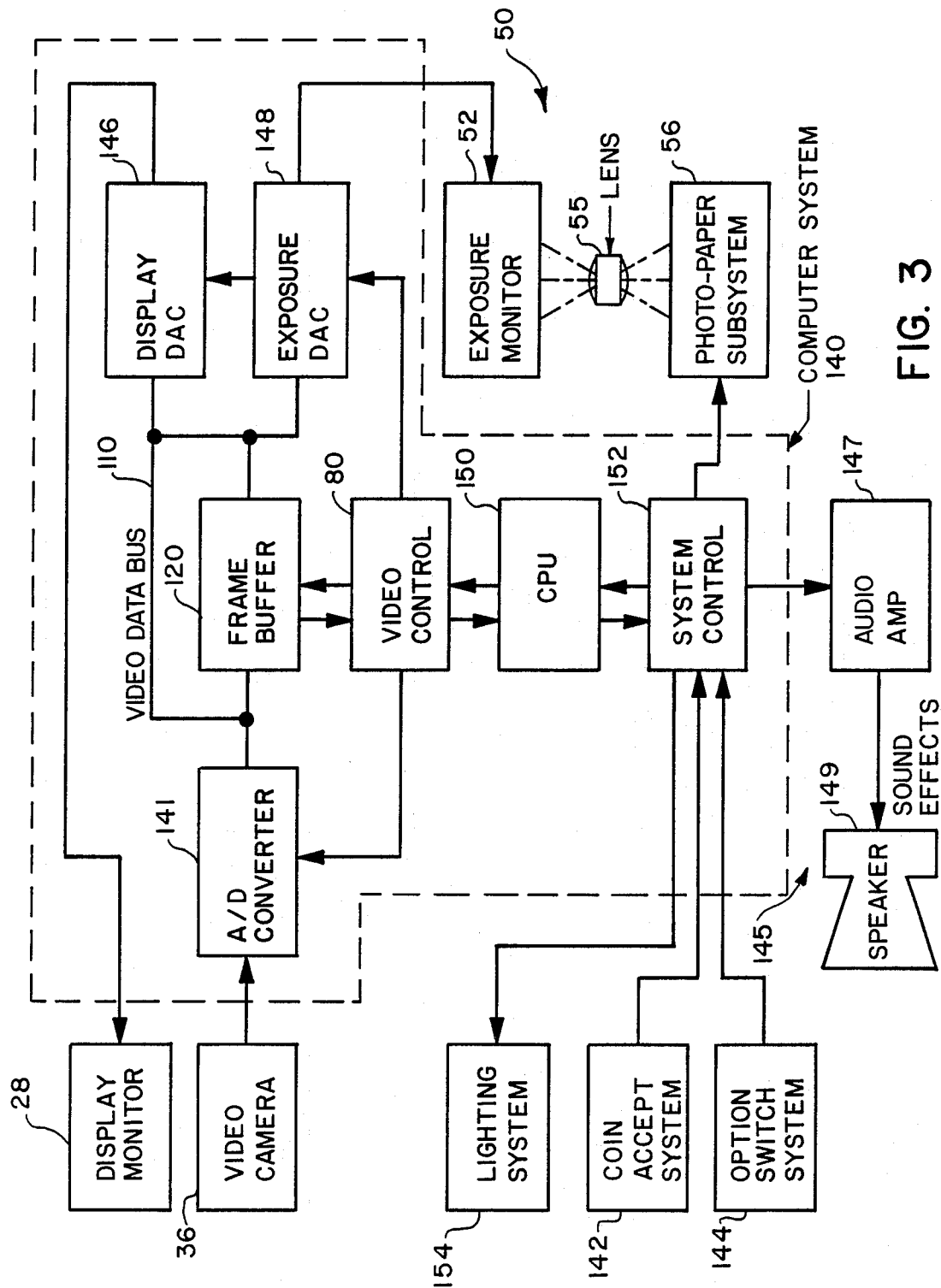
FIG. 3 is a system block diagram of the apparatus in accordance with this invention.

With particular reference to FIG. 3, there is shown a system block diagram for the apparatus in accordance with this invention. The apparatus includes three major systems and two minor systems. The major systems are the video system 20, the computer system 140 (designated by the area within the dotted lines) and the photographic system. The minor systems are the administrative system which includes both the coin acceptance subsystem 142 and the switch subsystem 144. The second minor system is the sound system 145.

The video system 20 includes a display monitor 28 and a video camera 36. The video camera 36 creates a video image of the subject, converts it to an electronic signal and sends it to the computer system 140. The computer system 140 processes the video signal and returns it to the display monitor 28, where the user may view himself in the monitor 28 in real time.

The computer system 140 includes an ADC 141 for converting the analog signal to a digital signal. The digital signal is fed through a video data bus 110 to a frame buffer 120 where it is stored. A video control 80 synchronizes the sending of the digital signal to the frame buffer 120 and addresses the data for storage in the frame buffer 120.

The video data bus 110 is connected directly to a display DAC 146 for display of the subject in real time or "live". This line is enabled by the video control 80 during a time delay between poses. The display DAC 146 converts the digital signal to an analog signal and returns it to the display monitor 28.

The frame buffer 120 stores the video image as a series of signals. Upon signal from the video control 80, the frame buffer 120 sends the stored signals comprising the image to the display DAC 146 and to an exposure DAC 148. As previously stated, the display DAC returns the signal in analog form to the display monitor 28. The exposure DAC 148 converts the digital signal to an analog signal and sends the video image to the photographic system 50 upon an appropriate signal from the video control 80.

The computer system 140 also includes a CPU 150 or central processing unit which comprises an 8 bit microprocessor, a ROM (read only memory) for storing the operating program and a RAM (random access memory) for temporary storage of data during program execution. The CPU 150 also stores a permanent image of a model subject which is used to attract users during an attract mode. Further details of the attract mode are described below.

The computer system 140 also includes a system control which provides the CPU 150 with the means to control the non-video operating systems such as the paper feeding and cutting system, the user interface system including the coin acceptance subsystem 142 and switch subsystem 144 and system timing. The preferred embodiment of this subsection comprises an 8 bit output port, an 8 bit input port, and a digital timer IC, which contains three 16 bit programmable counters.

In the preferred embodiment shown in FIG. 3, the frame buffer 120 communicates with the CPU 150 through the video control 80. This enables the CPU 150 to evaluate the video image pixels gray scale values to adjust and readjust the booth lighting. Thus, if an image is too light and booth lighting can be turned up based on pre-set values fed into the CPU 150. Thus, the booth can be customized to suit the skin tone of a user as well as the particular location and lighting conditions of the booth.

The photographic system 50 includes an exposure monitor 52, a lens 55 and a photo-paper subsystem 56. The exposure monitor 52 receives the analog signal of the video image from the exposure DAC 148 of the computer system 140. The exposure monitor 52 is a CRT which is aligned with the lens 55 and the photo-sensitive paper 56 for exposing photo-sensitive paper. The exposure DAC 52 inverts the image so that the exposure monitor 52, in fact, creates a negative on the photo-sensitive paper.

The paper-photo subsystem 56 includes photo-sensitive paper, paper drive mechanism 58, paper cutter 60 and a thermal processor 62, as explainer earlier reference to FIG. 2.

A system control 152 signals the paper drive mechanism 58 when to move the paper and additionally signals the paper cutter 60 when to cut the paper. The thermal processor 62 is also controlled by the system control 152.

As set forth above, the photographic system 50 includes the exposure monitor 52, the lens 55 and a photo-paper subsystem 54. The exposure monitor 52 receives the analog signal of the video image from the exposure DAC of the computer. The exposure monitor 52 is a CRT which is aligned with the lens 55 and the photo-sensitive paper 56 and exposes the photo-sensitive paper 56 through the lens 55. The exposure DAC inverts the image so that the exposure monitor 52, in fact, creates a negative image on the photo-sensitive paper 56.

Also, as set forth above, the photo subsystem 54 includes the photo sensitive paper 56, the paper drive mechanism 58, the paper cutter 60 and the thermal processor 62 as explained earlier with reference to FIG. 2. The system control signals the paper drive mechanism 58 when to move the paper and additionally signals the paper cutter 60 when to cut the paper. The thermal processor 62 is also controlled by the system control.

The coin acceptance system 142 includes a means for accepting coins. It will also be appreciated that the acceptance system could be adapted to accept paper money as well. When the coins have reached a predetermined amount, for example, one dollar, the coin acceptance signals the system control 152 to activate the apparatus. The system control 152 through the CPU 150, video control and frame buffer 120 sends a text message through the display DAC 146 which appears on the display monitor 28 giving instructions to the user. When the apparatus is activated and the first picture is ready to be taken, the lighting system 154 is activated to provide the best possible setting for the photograph. The intensity of the lighting system 154, which includes a series of incandescent and fluorescent lights is then adjusted for producing a photograph of maximum clarity.

After the apparatus is activated, a text message will appear on the display monitor 28, asking the user whether he wishes to have normal or distorted photographs. The option switch system 144 includes an option switch which can be toggled to either the normal or distorted mode. Once the user selects the option, the apparatus begins its countdown for taking the first photograph. The countdown appears on the display CRT.

The apparatus further includes a sound system 145 including an audio amplifier 147 and a speaker 149. The sound system 145 is used generally to encourage interaction of the user with the computer. The sound system 145 attracts customers as well as communicating and entertaining the user during processing and development of his photographs.

Figure 4:
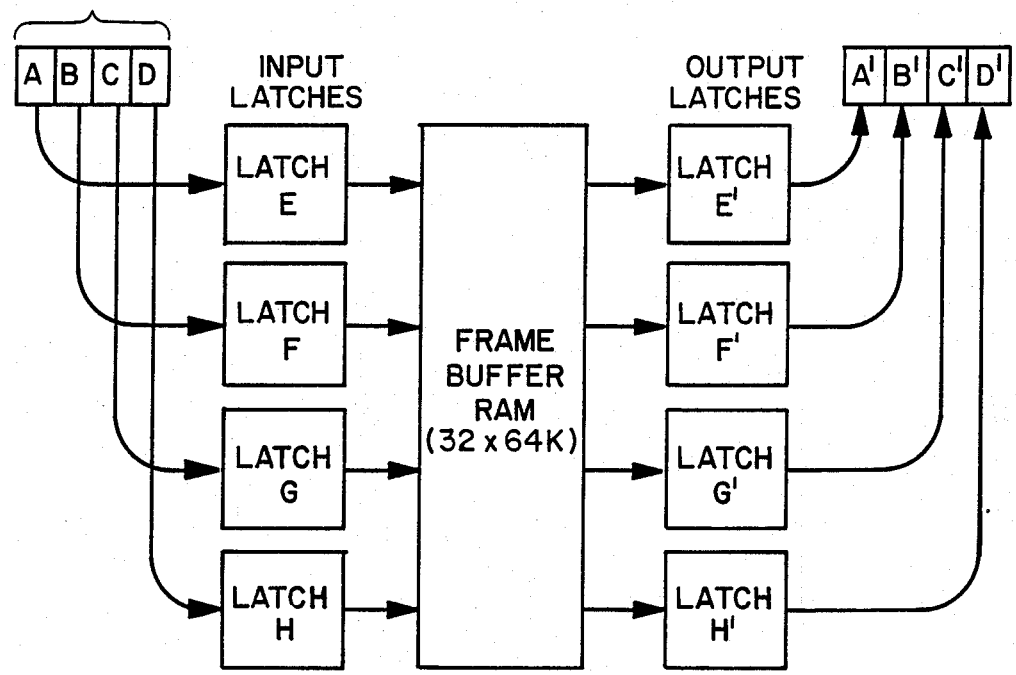
FIG. 4 is a schematic illustration of the frame buffer of the apparatus in accordance with this invention.

FIG. 4 illustrates, in greater detail, the operation of the frame buffer. The frame buffer stores the video data from the video camera 36, after the ADC has converted the analog signal to a digital signal. The frame buffer shown in FIG. 4 has 4 input latches, E, F, G, and H, a 64 kilobyte by 32-bit dynamic ram array, four output latches E', F', G', and H' and a ram control IC. The frame buffer stores data sufficient to reproduce an image with 512 pixel resolution and a 256 level gray scale.

The digital video data is broken up into pixels. Each pixel requires 8 bits of memory. Each screen consists of 512 pixels in the horizontal direction and 512 pixels in the vertical direction. Each pixel is coded with a gray scale value of from 0 to 255, thus there are 256 different gray scale values which a pixel can be assigned. In the scale used for the purposes of this invention, pure black represents 0 and pure white represents 255. The pixel is assigned the value of 0 to 255 by a flash converter which is within the ADC. The flash converter reads each pixel and determines the lightness or darkness of the video image and then assigns the value from 0 to 255.

The pixels are presented sequentially to the input latches E, F, G, and H as 8-bit words A, B, C, and D. Thus, 128 horizontal address locations are required (512 divided by 4). The data is read into the frame buffer from the video data bus. The data is clocked into the 4 frame buffer input latches E, F, G and H, sequentially by the video control, such that four 8-bit words (A, B, C and D) are stored in the ram array as one 32 bit data word. This is done because the video data may be written into the ram at one-quarter the speed at which it is digitized. This allows the use of a standard speed, 200 ns. (nano second) access time, dynamic ram device. The clocking of the data into the four input latches E, F, G and H and the ram control signals are synchronized by the video control so that the data is written from the four input latches E, F, G and H to the ram IC before the first of the next four pixel values is presented and latched at the frame buffer. It takes 400 ns. to latch one 32 bit word (100 ns. $\times$ 4).

Data is read from the frame buffer to reproduce the video image as follows. Data is read from the dynamic ram IC into the four output latches E', F', G' and H' in parallel. The latches employ "tri-state" outputs, so that their outputs may be tied or hand wired together. The latch outputs E', F', G' and H' are enabled and read into the video data bus one at a time, in sequence, thus recreating the serial data stream which was originally written into the frame buffer from the vido data bus.

As shown in FIG. 3, the frame buffer is connected to a pair of DAC's comprising the means to convert a digital signal to an analog signal. The video data bus at this time is routed to the display DAC and the exposure DAC. Thereby the image stored in the frame buffer is displayed on the display monitor. The image displayed on the display monitor is labeled A', B', C' and D' of FIG. 4 which is a 32-bit word, which is presented sequentially to the display monitor 28, such that after all the data has been read out the full image is displayed. This takes approximately $33\frac{1}{3}$ milliseconds.

The apparatus in accordance with this invention includes a regular mode for producing normal photographs and a humorous mode for producing distorted photographs. In the normal mode, when image distortion is not desired, the video data bus may be directly routed to the display DAC so that the stored image may be displayed on the video monitor. This gives the user a live image during the posing period for each processing of each photograph. After the countdown for a pose, the data is written into the frame buffer. The data is subsequently read out sequentially from the frame buffer to the video data bus to provide a "frozen" image on the display CRT. The exposure DAC converts the digital signal to an analog signal and the photographic system 50 makes a photograph from the video image. A series of four photographs are made.

The apparatus in accordance with this invention also includes the ability to make distorted photographs in the humorous mode. The distorted photographs are accomplished by distorting the video image and printing that image. The image distortion is accomplished by manipulating the address signals which access the data in the frame buffer.

As described earlier, the video control addresses the data sent to the frame buffer from the ADC. The address signals are generated by a CRT controller IC within the video control. The address signals are generated by the CRT controller IC such that 128 buffer locations are accessed during each horizontal scan. (Recall there are 128 address locations for each horizontal scan.) Each buffer location contains data for four sequential 8-bit words A, B, C and D, as described earlier with reference to FIG. 4. This is sufficient to reproduce 512 pixels per horizontal scan ($128 \times 4 = 512$).

Figure 5:
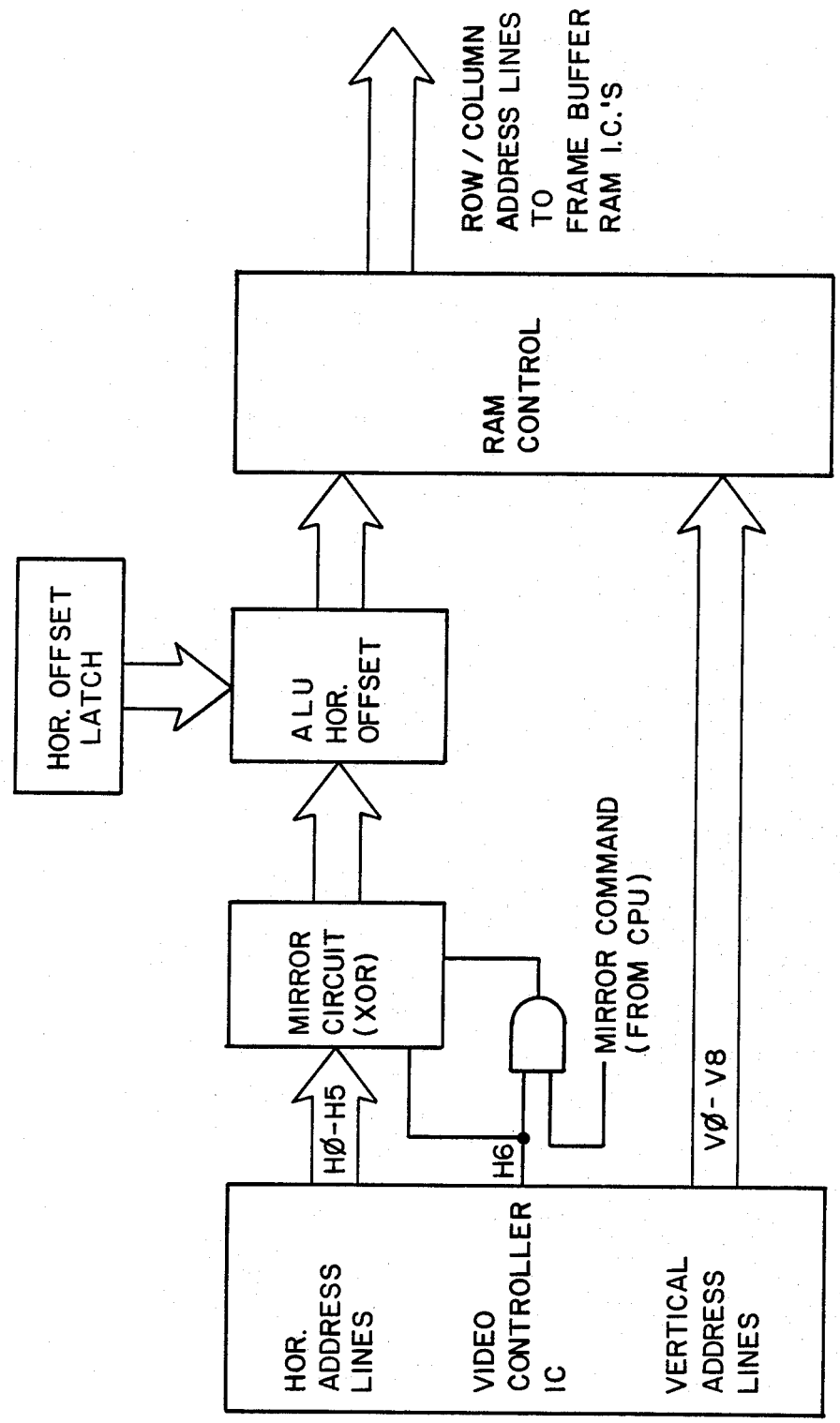
FIG. 5 is a schematic illustration of the video control of the apparatus in accordance with this invention.

The apparatus and process for manipulating the address signal and creating distorted photographs will now be described with reference to FIGS. 5 and 6. The address signals are arranged in a matrix of seven horizontal address lines (128 locations) by nine vertical address lines (512 scans per frame). Only the horizontal address lines are used for image distortion. The vertical address lines are not affected and as shown in FIG. 5 the vertical address lines outputs $V_0$-$V_8$ are sent directly to the ram control.

The first step in the manipulation process is to mirror one half of the video image on the other half of the video image. For purposes of illustration, a frame of video information stored in the frame buffer is analogous to a video "snap-shot". The preferred embodiment calls for the left half of the video image to be mirrored on the right half of the video image. It will, of course, be appreciated that the right half could be mirrored on the left half within the scope of this invention. The left half of the mirror image is mirrored onto the right half by repeating horizontal address signals of the left hand half in inverse order during the right hand half of each horizontal scan line. The actual right hand half of the video image data is not accessed during this mode of operation. The video controller counts the number of horizontal scan addresses and determines when the right half is about to be read. After the "snap shot," a mirror command from the CPU enables an exclusive OR circuit as shown in more detail in FIG. 7 and creates the mirroring effect discussed above.

Figure 6:
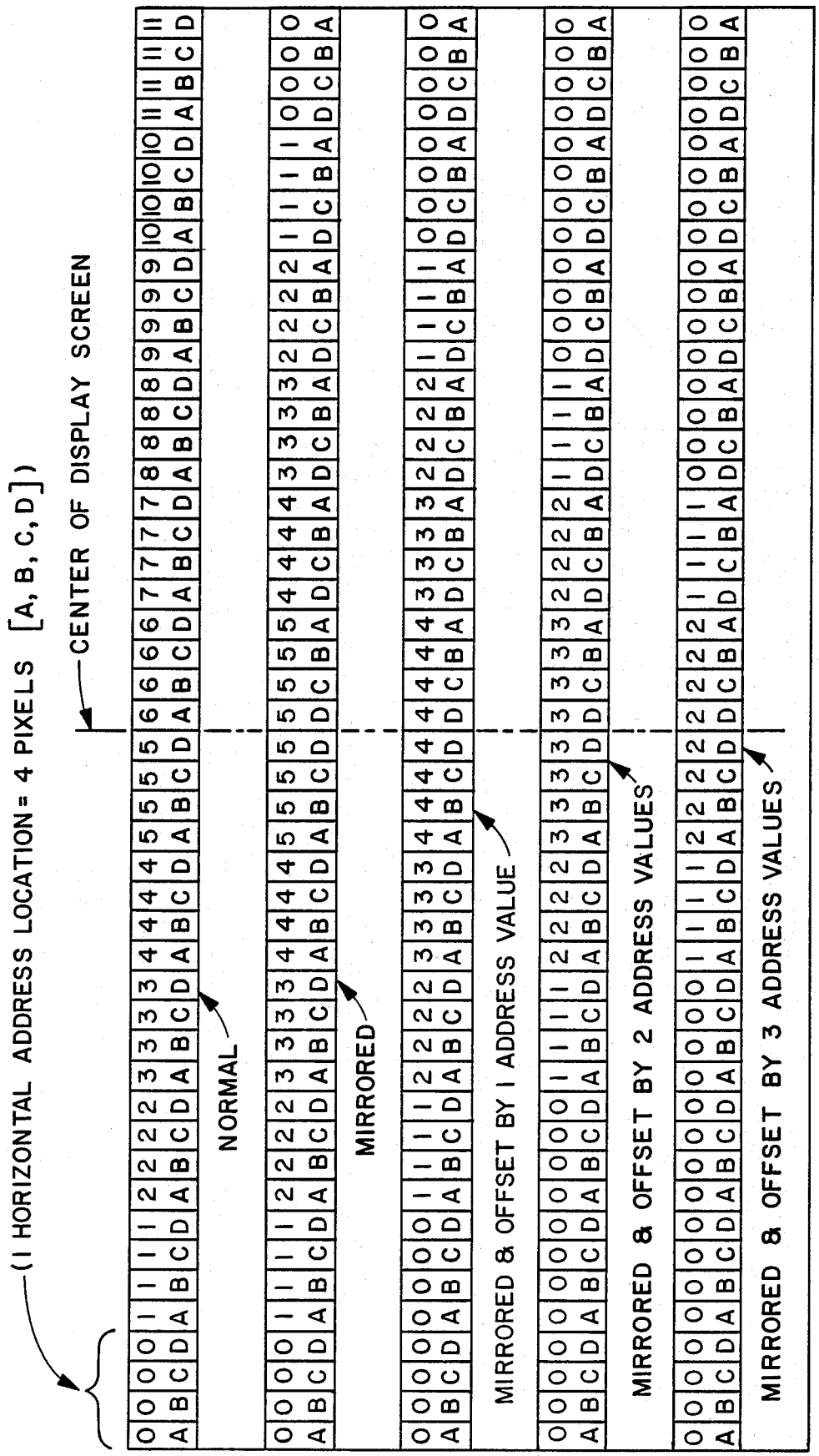
FIG. 6 is a schematic representation of the manipulation process in accordance with this invention.

FIG. 6 shows one horizontal address line having 12 locations of preformed pixels A, B, C and D each. Of course, the embodiment of the invention has 128 address locations. However, the principles of operation are the same regardless of the number of address locations. The 12 address location embodiment shown in FIG. 6 is for illustration purposes only.

The first horizontal scan line labeled normal is the digitized first horizontal scan line as read from the frame buffer in its undistorted format. As the data is read from the frame buffer when the mirror circuit is enabled, what is read out as address location 6 contains what is in address location 5, what is read out as address location 7 contains what is in address location 4 and so on, until what is read out as address location 11 contains what is in address location 0. Thus, if there were 128 locations, when the address location 127 was read, the value of the data in location 0 would be used. Using this method the data on the left hand side of the horizontal scan is repeated on the right hand side in inverse order, until all the data has been read. It will be appreciated that the same algorithm could be followed for a scan line of any length. Thus, horizontal scan line of FIG. 6 mirrored illustrates the application of the above on a horizontal scan line having 12 address locations.

The image is further manipulated by offsetting address location values. The video control includes a horizontal offset latch and an arithmetic logic unit (ALU) for further manipulating the image. The bottom 3 scan lines of FIG. 6 illustrates offsetting address values. In the scan line labeled MIRRORED & OFFSET 1 address value, the address has been offset by 1. Thus, the data in address location 0 is accessed as though its address value is 1, the data in address location 1 is accessed as though its address value is 2 and so on. When the horizontal scan is on the right hand half the came process is followed except in reverse order.

Figure 9:
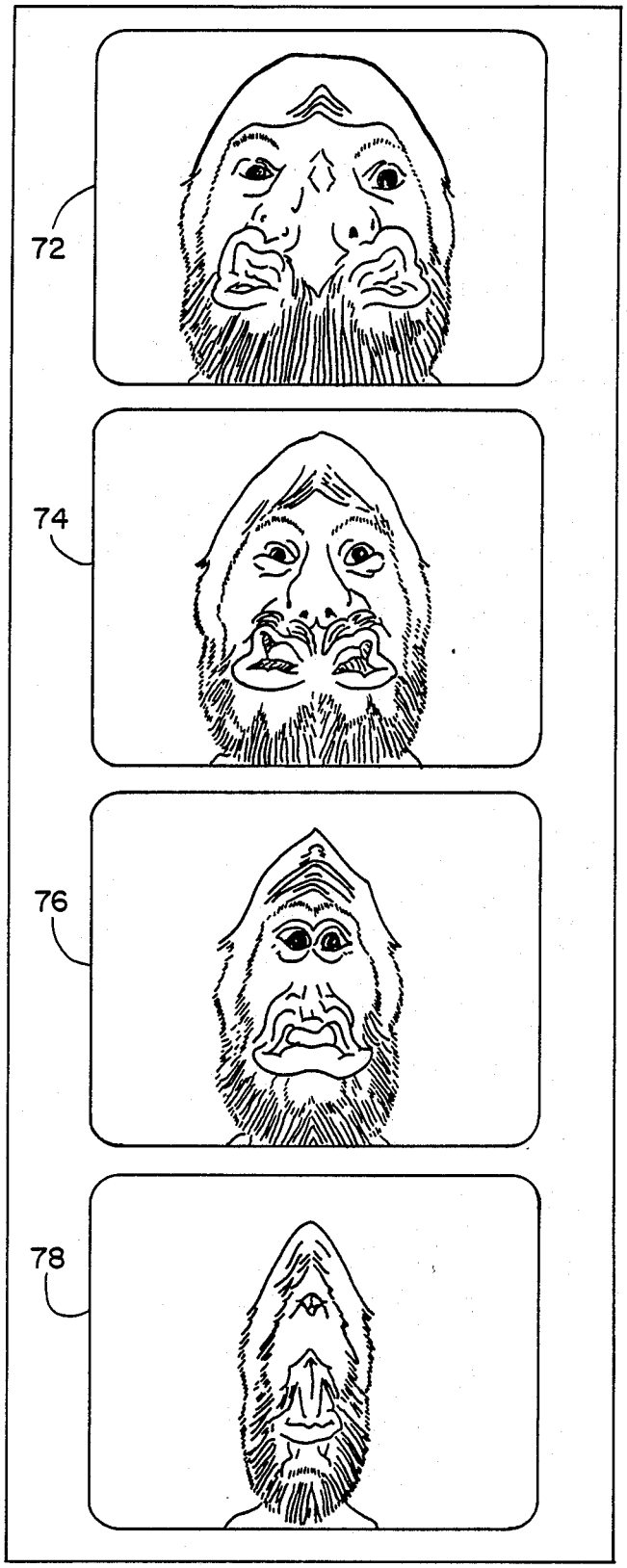
FIG. 9 illustrates a sample output photograph using this invention in the distorted mode.

The horizontal scan lines labeled MIRRORED & OFFSET by 2 and 3 address values of FIG. 6, illustrate further manipulation of the address values and thereby the video image. Variations in the process are, of course, possible within the scope of this invention. As described earlier, the offset process could be done by selecting a random number for each offset or by obtaining the offset number by a known algorithm. FIG. 9 illustrates offsetting the address values by 6 each time.

As can be seen in FIG. 9, the further manipulation process of the preferred embodiment has the effect of extracting the middle most pixels from the image and moving the outermost pixels towards the center. Since the horizontal address values which access the left hand half of the image data are mirrored during the scan of the right hand half of the image, any offset in the address location towards or away from the left side of the scan line is mirrored on the right hand side of the display.

Figure 7:
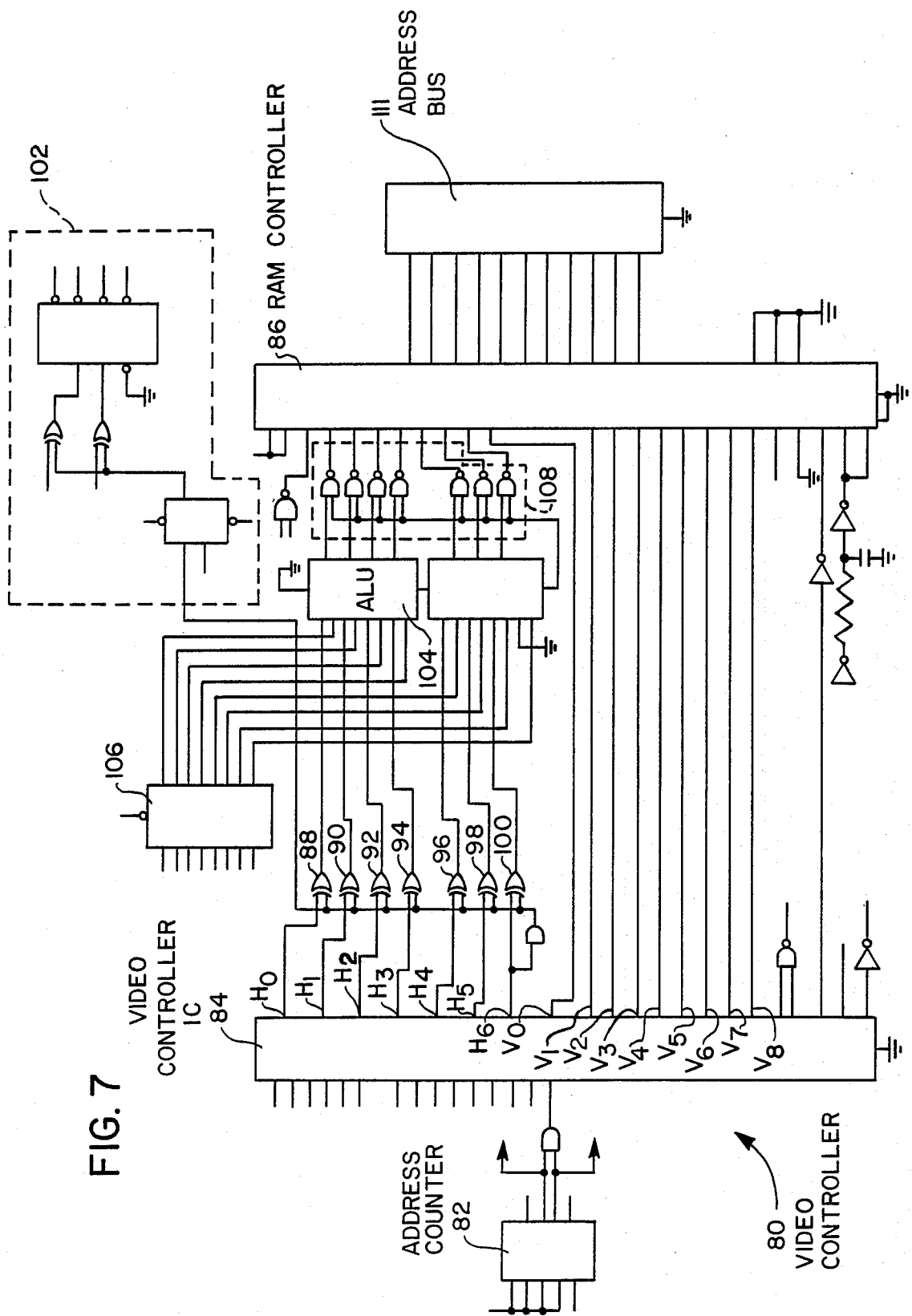
FIG. 7 is an electrical schematic of the video controller in accordance with this invention.

As will be appreciated negative products may result from this procedure. All negative products are clamped to zero by means of a clamping circuit 108 as shown in FIG. 7. Thereby, the first set of pixels (horizontal address=0) is repeated until the first non-zero product is addressed.

FIG. 7 illustrates in detail the video controller. The video controller generally shown by the numeral 80 in FIG. 7 includes a horizontal address counter 82 in the video controller IC for generating the scan lines and particularly for generating the number of horizontal address scan lines. The video controller IC 84 generates 7 horizontal address signals $H_0$–$H_6$ and 9 vertical address signals $V_0$–$V_8$. The vertical address lines are connected directly to the dynamic RAM controller IC 86.

In the humorous mode the image is distorted by mirroring the left hand half of the image on the right hand half of the image. To accomplish this, each of the horizontal address lines $H_0$–$H_6$ are connected to an exclusive OR gate 88–100, respectively. During the left hand half of the horizontal scan, the horizontal values are read without manipulation. However, once the most significant horizontal bit, namely $H_6$, goes high, it activates the address invention circuit. Thus, at least one input for each of the exclusive OR gates 88–100, is turned to high. This has the effect of inverting the horizontal address for the remainder of the horizontal scan. The address bits are then counted down rather than up, creating, the mirroring effect described above.

The video control 80 includes a circuit 102, represented by the area inside the dotted lines, for retaining the symmetry of the image. The circuit 102 generates four signals that enable output latches E', F', G' and H' to output the pixels values A', B', C' and D'. The right hand half of the horizontal scan period, the input signals to 102 are inverted so that the pixel data come in corrected (inverted sequence.

The exclusive OR gates 88–100 are connected to an ALU 104 which subtracts the value contained in the horizontal offset latch 106 from the output values of the exclusive OR gates 88–100. This facilitates the offsetting discussed above.

The ALU 104 is connected to a clamping circuit 108, represented by the area inside the dotted lines, which clamps all negative values to 0. Thus, after offsetting, if an address value is negative, the circuit 108 clamps the values to 0. The clamping circuit 108 is connected to dynamic RAM controller IC 86 which generates the address signals for the frame buffer through the address bus 111.

Figure 8:
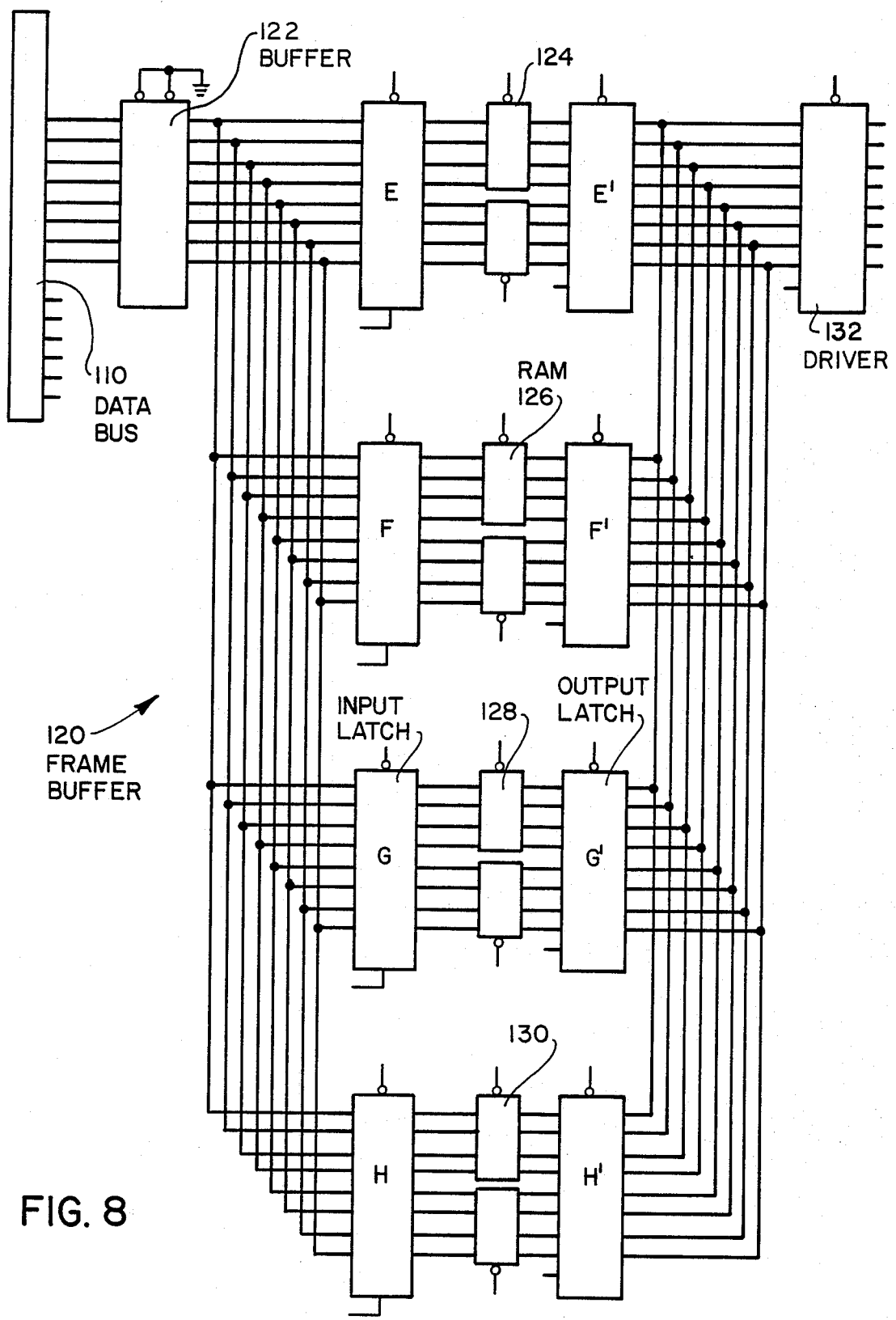
FIG. 8 is an electrical schematic of the frame buffer of the apparatus in accordance with this invention.

FIG. 8 is an electronic schematic representation of the frame buffer. The frame buffer is shown generally in FIG. 8 by the numeral 120. The frame buffer 120 receives the video data from data bus 110. An input receiving buffer 122 receives the data from bus 110. The input receiving buffer 122 cleans up the data received by clamping low values to 0V and high values to 5V. The input receiving buffer is connected to the frame buffer input latches E, F, G, and H. Each input latch is connected to a pair of RAM IC, 124, 126, 128 and 130, respectively, for storing the data. Each pair of RAM ICs is connected to an output latch, E', F', G' and H'. The outputs E', F', G' and H' are tied together and read out sequentially each output as a 32-bit word. (Each of the input latches E, F, G and H and E', F', G' and H' are tri-state switches as discussed above, which enables them to be tied together.) The data is read out onto the video date bus 110 by driver IC 132.

The data is stored in the RAM IC's 124–130 for one transaction only. After a new coin insertion, new data from a new subject is read into the RAM IC's 124–130, in effect erasing the old data. This differs from the attract mode where the video image data model user is stored permanently in the memory of the CPU. After each transaction the attract mode is down loaded to the frame buffer by the CPU and displayed on the display monitor.

In Use

Prior to the user inserting coins, the apparatus sends a display to the customer to encourage him to deposit coins to activate the machine. The system displays a preprogrammed image which is manipulated by the system. This is accomplished by sound effects through the sound system. This is known as the attract mode.

Assuming the user decides to use the apparatus, he will sit on seat 16 positioning himself on cushion 18 in direct alignment with the video camera 36. The user then deposits $1.00 worth of coins into the coin acceptance device 38, which sends a signal to the system control. The CPU monitors the coin insertion and counts until the required amount has been inserted. Upon the required amount being inserted, the apparatus is activated. The system prompts the user through the display monitor by writing text to select the normal or humorous mode.

Normal Mode

Assuming that the user selects the normal mode by use of the switch 40, he is informed that he will have four opportunities to pose, commencing in five seconds, with five seconds between each pose. All instructions to the user are given through the text characters superimposed over the user's image in the display monitor.

The system now counts down five seconds, updating the display and informs the customer of the time until the video "snap-shot" will be taken. During this time the system also feeds photo-sensitive paper into the first exposure position. When the five seconds has elapsed, the system control brightens the booth by increasing the intensity of the lighting and performs a frame-freeze operation. This operation takes approximately $33\frac{1}{3}$ milliseconds, the time it takes to scan one entire video frame.

Once the image has been stored in the frame buffer, the booth 10 lights are dimmed and the paper exposure procedure is initiated. The exposure monitor, normally blank to avoid exposing paper, is now enabled and projects an inverted image of the video snap-shot (or negative) onto the photo-sensitive paper. This continues until the paper has been exposed for the proper amount of time (a few seconds, depending on image intensity) after which the exposure monitor is once again blank. The paper is then fed forward to put the next section of paper in position to be exposed.

During this period of time the customer is experiencing a five second countdown. Entertaining music is activated by the system control to the audio amp and is heard by the user through the speaker. Each snap-shot includes this delay period and music is activated to entertain the user each time.

After the last exposure has been completed, the paper is cut and fed into a thermal processor, where a positive image is produced from each of the exposures. In a preferred embodiment, there are four exposures. The strip of four photographs is then issued to the user. After issuing the photographs to the user the system returns to its attract or idle mode.

Humorous Mode

The apparatus operation of the humorous mode in the initial stages is basically the same as the initial stages of the normal mode. When the user switches to the humorous mode, he is also informed that he will have 5 seconds until a snap-shot is taken. However, the user is told there will only be one pose.

The system counts down 5 seconds, updating the display to inform the customer of the time until the video snap-shot will be taken. The right side of the display is dimmed somewhat. This is done to indicate to the user which part of the original image will be distorted during the image distortion process. During this time the system feeds the photo-sensitive paper into the first exposure position as in the case of the normal mode. When five seconds have elapsed, the system brightens the booth lighting and performs a freeze-frame operation. This operation again takes approximately $33\frac{1}{3}$ milliseconds.

The video image is again stored in the frame buffer, the booth lights are dimmed and the image distortion process is initiated. The left side of the image is mirrored onto the right half of the frame by the address manipulation circuits as described above. The first and, of course, the least distorted of the four images is produced. The exposure monitor exposes the paper for the proper amount of time and is again blanked after performing this function. The paper is again fed forward and the next section of paper positioned to be exposed.

For the second photograph, the CPU activates the address manipulation circuit. This moves the image halves closer to the center of the display eliminating the middle most portion of the display and increasing the distortion of the image. The next exposure is then made. This procedure is repeated until all four photographs have been taken. In the preferred embodiment, the third and fourth photograph will each be successively more distorted because additional address values will be subtracted. Thus, the fourth photograph as shown in FIG. 9 is the most distorted of all.

After the last exposure has been completed the paper is cut and fed into the thermal processor where a positive image is produced from each of the four exposures. The strip of photographs is then issued to the user and the system reverts to the attract mode.

FIG. 9 illustrates a sample of the output of the apparatus in accordance with this invention which is a strip of four photographs generally indicated by the numeral 70. The first frame 72 shows the image distortion in the mirrored condition with the left and right hand sides being symmetrical. The second frame 74 shows the mirrored distortion plus the horizontal address locations being offset by 6 address values. The third frame 76 shows the mirrored distortion plus the address values being offset by 12 location values. The fourth frame shows the mirrored distortion plus the horizontal address values being offset by 18 location values.

The computer system 140 is run by a computer program entitled Photovideo. A copy of the source code and object code of this program is attached to this patent application as an Appendix.

While the instant invention has been described by reference to what is believed to be the most practical embodiments, it is understood that the invention may embody other specific forms not departing from the spirit of the general characteristics of the invention. It should be understood that there are other embodiments which possess the qualities and characteristics which would generally function in the same manner and should be considered within the scope of this invention. The present invention therefore should be considered in all respects as illustrative and not restrictive, the scope of the invention being limited solely to the appended claims rather than the foregoing description and all equivalents thereto being intended to be embraced therein.

```
                TITLE   'PHOTOVIDEO'

;   OPERATING PROGRAM OF "PHOTOVIDEO" PHOTO BOOTH
        ;   COPYRIGHT AUG 15,1985
        ;   MICHAEL H. BREWER
        ;   12 SECOND EXP. VERSION. JULY 10,1986

0000 =          BASE    EQU     0       ;BASE ADDRESS OF I/O

;CONTROL PORTS

0000 =          VCONT   EQU     BASE    ; VIDEO CONTROL PORTS (8255)

;D0: LO = WRITE TO RAM , HI = READ RAM
                ;D1: LO = FRAME BUFFER IS SOURCE, HI = ADC IS SOURCE
                ;D2: HI = MIRROR MODE ENABLED
                ;D3: HI = EXPOSE PAPER
                ;D4: HI = DIM RIGHT HALF OF DISPLAY
                ;D5: HI = MAIN DISPLAY ON
                ;D6: HI = CPU BUS ACCESSES FRAME BUFFER AND VIDEO BUS
                ;D7: HI = CPU BUS WRITES TO FRAME BUFFER

0001 =          HBUMP   EQU     VCONT+1 ;HORIZONTAL BUMP CONTROL

;THIS PORT ENABLES CPU TO MOVE VIDEO IMAGE HORIZONTALLY
                ;7F(HEX) = NORMAL; EACH REDUCTION MOVES IMAGE ONE CHARACTER
                ;TO THE RIGHT

0002 =          TEXCON  EQU     VCONT+2 ; TEXT CONTROL PORT (LOWER 4 BITS)
                ;D0: HI = TEXT DISPLAYED ON MAIN MONITOR
                ;D1: HI = TEXT DISPLAYED ON PAPER EXPOSURE MONITOR
                ;D2: HI = USE ALTERNATE CHAR SET

0002 =          VSTAT   EQU     VCONT+2 ; VIDEO STATUS PORT (UPPER 4 BITS)
                ;D4: HI = VERT SYNC PERIOD
                ;D5: (RA0) LO = FIRST FIELD , HI = SECOND FIELD
                ;D6: HI = HOR SYNC PERIOD (NOT RECOMMENDED, COMPUTER CAN MISS IT
                ;D7: HI = H7 PERIOD (MOST SIGNIFICANT HOR CHAR COUNT BIT
                ;     (BETTER ALTERNATIVE TO H SYNC)

0003 =          VCCON   EQU     VCONT+3 ;CONTROL PORT FOR 8255
                ;SET SO PA = OUT, PB = OUT, PCL = OUT, PCH = INPUT

0004 =          SSTAT   EQU     BASE+4  ;SYSTEM STATUS PORT
                ;D0: LO = BILL ACCEPTED
                ;D1: LO = FUNNY FACE REQUEST
                ;D2: LO = REGULAR PHOTO REQUEST
                ;D3: LO = CUTTER HOME
                ;D4: HI = PAPER DETECT SWITCH
                ;D5: LO = SERVICE MODE SWITCH
                ;D6: LO = SPARE
                ;D7: LO = SPARE

0005 =          SCONT   EQU     SSTAT+1 ;SYSTEM CONTROL PORT (8255)
                ;D0: LO = PAPER DRIVE 1
                ;D1: LO = PAPER DRIVE 2
                ;D2: LO = CUTTER ON
                ;D3: LO = HEATER ON
                ;D4: LO = LIGHTS BRIGHT

0006 =          RCONT   EQU     SSTAT+2 ;ATTRACT MODE ROM SELECT (MEM BANK)
                ;D0 THROUGH D2 FORM THREE BIT CODE WHICH SELECTS ONE OF EIGHT
                ;ROMS MAPPED AT 8000H

;ALSO REAL TIME CLOCK ACCESS ENABLE
                ;D3: HI = ACCESS REAL TIME CLOCK
```

```
                ;D4 - D7 ARE INPUTS
                ;D4: HI = 8253 TIMER TIMED-OUT
                ;D5: LO = REAL TIME CLOCK PULSE ACTIVE (7.8125 MS)
                ;D6: HI =
                ;D7: HI =

0007 =          SSCON   EQU     SSTAT+3 ;8255 CONTROL PORT
                ;SET SO THAT PA = INPUT, PB = OUTPUT, PCL = OUTPUT, PCH=INPUT

0008 =          TIMER   EQU     BASE+8  ;BASE ADDRESS OF 8253-5 TIMER
000B =          TCONT   EQU     TIMER+3 ;TIMER CONTROL PORT
0008 =          COUNT0  EQU     TIMER+0 ;COUNTER 0 LOAD ADDRESS
0009 =          COUNT1  EQU     TIMER+1 ;COUNTER 1 LOAD ADDRESS
000A =          COUNT2  EQU     TIMER+2 ;COUNTER 2 LOAD ADDRESS
0034 =          MODE0   EQU     34H     ;COUNTER 0 SET TO MODE 2
0070 =          MODE1   EQU     70H     ;COUNTER 1 SET TO MODE 0
00B6 =          MODE2   EQU     0B6H    ;COUNTER 2 SET TO MODE 3

;CPU BUS TO/FROM FRAME BUFFER DATA LATCHES

000C =          BRAMA   EQU     BASE+0CH
000D =          BRAMB   EQU     BASE+0DH
000E =          BRAMC   EQU     BASE+0EH
000F =          BRAMD   EQU     BASE+0FH

0010 =          CRTC    EQU     BASE+10H;BASE ADDRESS OF CRT CONTROLLER

;5027 CRT CONTROLLER CONTROL REGISTERS

0010 =          REG0    EQU     CRTC+0  ;HORIZONTAL CHARACTER COUNT (-1)
0011 =          REG1    EQU     CRTC+1  ;INTRLACE, H SYNC WIDTH, H SYNC DELAY
0012 =          REG2    EQU     CRTC+2  ;SCANS/DATA ROW, CHARACTERS/DATA ROW
0013 =          REG3    EQU     CRTC+3  ;SKEW BITS, DATA ROWS PER FRAME (-1)
0014 =          REG4    EQU     CRTC+4  ;SCAN LINES PER FRAME
0015 =          REG5    EQU     CRTC+5  ;VERTICAL DATA START
0016 =          REG6    EQU     CRTC+6  ;LAST DISPLAYED ROW (-1)
001E =          BTC     EQU     CRTC+0EH;WRITE TO HERE TO BEGIN TIMING CHAIN
001A =          RESET   EQU     CRTC+0AH;RESET 5027

0020 =          RTC     EQU     BASE+20H;BASE ADDRESS OF REAL TIME CLOCK
0020 =          SEC     EQU     RTC     ;SECONDS REGISTER
0021 =          TSEC    EQU     RTC+1   ;TENS OF SECONDS
0022 =          MIN     EQU     RTC+2   ;MINUTES
0023 =          TMIN    EQU     RTC+3   ;TENS OF MINUTES
0024 =          HOUR    EQU     RTC+4   ;HOURS
0025 =          THOUR   EQU     RTC+5   ;TENS OF HOURS
0026 =          DAY     EQU     RTC+6   ;DAY OF MONTH
0027 =          TDAY    EQU     RTC+7   ;TENS OF DAYS OF MONTH
0028 =          MONTH   EQU     RTC+8   ;MONTH
0029 =          TMONTH  EQU     RTC+9   ;TENS OF MONTHS
002A =          YEAR    EQU     RTC+10  ;YEAR
002B =          TYEAR   EQU     RTC+11  ;TENS OF YEARS
002C =          WEEK    EQU     RTC+12  ;DAY OF WEEK
002D =          CLKCOND EQU     RTC+13  ;RTC CONTROL REG D
002E =          CLKCONE EQU     RTC+14  ;CONTROL REG E
002F =          CLKCONF EQU     RTC+15  ;CONTROL REG F

0005 =          HOLD    EQU     05H     ;HOLD FOR REG UPDATES
0002 =          BUSY    EQU     02H     ;ACCESS REGISTERS WHEN BUSY = 0
0000 =          STD     EQU     0       ;D1 = 0 THEN CONTINUOUS PULSES
0002 =          INT     EQU     2       ;D1 = 1 THEN PULSES IN INTRPT MODE
0000 =          E64TH   EQU     0       ;PULSE EVERY 1/64TH SEC
0004 =          ESEC    EQU     4
0008 =          EMIN    EQU     8
000C =          EHR     EQU     0CH

0001 =          IE5     EQU     1       ;SPURIOUS INTERRUPT FLAG
0002 =          IE6     EQU     2       ;SPURIOUS INTERRUPT FLAG
0003 =          IE7     EQU     3       ;SPURIOUS INTERRUPT FLAG
0004 =          OPERR   EQU     4       ;OUT OF PAPER FLAG
0030 =          SIM     EQU     30H     ;GETS SIM INSTRUCTION BY ASSEMBLER
```

```
0088 =              VWORD    EQU    88H         ;VCONT PORTS SET-UP WORD (8255)
0098 =              SWORD    EQU    98H         ;SCONT PORTS SET-UP WORD

0000                         ORG    0

0000 C30001         BEGIN:   JMP    0100H       ;JMP AROUND INTERRUPTS

002C                         ORG    02CH        ;BILL ACCEPTOR INTERRUPT

002C C3510C                  JMP    BSERVE      ;SERVICE ROUTINE

0034                         ORG    034H        ;REAL TIME CLOCK INTERRUPT

0034 C33F0C                  JMP    RTSERVE     ;SERVICE ROUTINE

003C                         ORG    03CH        ;TIMER INTERRUPT

003C C3020C                  JMP    TSERVE      ;SERVICE ROUTINE

0100                         ORG    0100H

;SET STACK POINTER
0100 310024         INIT:    LXI    SP,2400H
                             ;INIT SYSTEM PORTS
0103 3E88                    MVI    A,VWORD     ;INIT PORTS
0105 D303                    OUT    VCCON
0107 3E98                    MVI    A,SWORD
0109 D307                    OUT    SSCON 010B 3E0F                    MVI    A,0FH       ;INIT SCONT
010D D305                    OUT    SCONT

;INIT TIMER
010F 3E34                    MVI    A,MODE0     ;SET COUNTER 0 TO MODE 2
0111 D30B                    OUT    TCONT
0113 3E70                    MVI    A,MODE1     ;SET COUNTER 1 TO MODE 0
0115 D30B                    OUT    TCONT
0117 3EB6                    MVI    A,MODE2     ;SET COUNTER 2 TO MODE 3
0119 D30B                    OUT    TCONT
011B 3E00                    MVI    A,00H       ;SET COUNTER 1 TO 0000H(MAX)
011D D308                    OUT    COUNT0      ;LS BYTE
011F D308                    OUT    COUNT0      ;MS BYTE

0121 CD4105                  CALL   DELAY
0124 CD5D05                  CALL   VINIT       ;INITIALIZE CRTC

0127 DB04                    IN     SSTAT       ;LOOK AT CUTTER HOME SWITCH
0129 E608                    ANI    8
012B C40F09                  CNZ    CUT         ;INITIALIZE CUTTERS IF NECESSARY

012E CD320A         MAIN:    CALL   QUIET       ;MAKE SURE AUDIO IS OFF
0131 310024                  LXI    SP,2400H    ;RE-INIT SP IN CASE TRASHED
0134 3E01                    MVI    A,1         ;INIT VCONT (READ FRAME BUFFER)
0136 D300                    OUT    VCONT
0138 3E7F                    MVI    A,127       ;INIT HBUMP
013A D301                    OUT    HBUMP
013C 3E00                    MVI    A,0         ;INIT TEXCON
013E D302                    OUT    TEXCON
0140 3E00                    MVI    A,0         ;INIT RCONT AND RTC ACCESS
0142 D306                    OUT    RCONT
0144 DB04                    IN     SSTAT       ;LOOK FOR SERVICE SWITCH ACTIVE
0146 E620                    ANI    20H
0148 CA2A0E                  JZ     SERVICE 014B 3E0F                    MVI    A,0FH       ;INIT SCONT (HEATER IDLE)
014D D305                    OUT    SCONT

;SET BILL DETECT INTERRUPT AND PROCEED WITH
                             ;ATTRACT MODE SEQUENCE. UPON BILL INTERRUPT,
                             ;PROGRAM JUMPS TO FUNNY/REG. SELECT SEQUENCE
```

```
014F 3E01              MVI     A,1         ;BILL INT FLAG
0151 320220            STA     BFLAG
0154 3E1E              MVI     A,1EH       ;SET INT. TO LOOK FOR "MONEY"(5.5)
0156 30                DB      SIM         ;SET INT. MASK
0157 FB                EI                  ;ENABLE INT.
0158 CD8D07            CALL    ERASE       ;ENSURE TEXT BUFFER CLEAN
015B CD720C            CALL    ATLOAD      ;WRITE ATTRACT MODE TO SCREEN
015E CD730C   ATTRACT: CALL    SCREEN1     ;FIRST ATTRACT MODE SEQUENCE (LOGO)
0161 CD3D04            CALL    SSW         ;SERVICE REQ?
0164 CDB10C            CALL    SCREEN2     ;SHOW ATTRACT MODE IMAGE
0167 CD3D04            CALL    SSW
016A CDF30C            CALL    SCREEN3     ;SLURP DISPLAY
016D CD3D04            CALL    SSW
0170 CD7E0D            CALL    SCREEN4     ;'INSERT $1.00' DISPLAY
0173 CD3D04            CALL    SSW
0176 C35E01            JMP     ATTRACT

;DOLLAR ACCEPT INTERRUPT JUMPS TO HERE

0179 CD320A   START:   CALL    QUIET       ;SHUT UP IF SLURPING
017C C31706            JMP     SELECT      ;CUSTOMER SELECTS FUNNY FACE
                                           ;OR REGULAR PHOTOS

;JUMP HERE FOR FUNNY FACES

017F CD8D07   FUNNY:   CALL    ERASE       ;ERASE TEXT
0182 CD9E07            CALL    BLANK       ;BLANK SCREEN
0185 CDA507            CALL    BORDER      ;WRITE BORDERS ON SCREEN 0188 3E23              MVI     A,023H      ;ENSURE ADC IS SOURCE
018A D300              OUT     VCONT       ;"LIVE" PICTURE

018C CDCD07            CALL    POSE        ;COUNTDOWN AND FREEZE

018F CD9B09            CALL    SKOOTCH     ;SKOOTCH PAPER 1.1 IN.

0192 CD8D07            CALL    ERASE       ;REMOVE BORDER

0195 CD4105            CALL    DELAY       ;SHOW FROZEN STRAIGHT SHOT
                                           ;FOR A FEW SECONDS

;SLURP AND EXPOSE COUNTRY

;SET RTC FOR 1/64 SECOND PULSES

0198 CDDB05            CALL    PULSE64

019B 3E04              MVI     A,4         ;4 PHOTO EXPOSURES
019D 320320            STA     PHOCNT

01A0 DB00              IN      VCONT       ;SET MIRROR MODE
01A2 F604              ORI     4
01A4 D300              OUT     VCONT

01A6 CDD708            CALL    EXP         ;FIRST EXPOSURE

01A9 3A0320            LDA     PHOCNT
01AC 3D                DCR     A           ;DECREMENT EXP. COUNTER
01AD 320320            STA     PHOCNT
01B0 21F70A            LXI     H,TABLE     ;INIT POINTER TO SLURP TONES

01B3 3EEB              MVI     A,235       ;LOAD DRIVE TIMES
01B5 320720            STA     MS0
01B8 3E0A              MVI     A,10
01BA 320820            STA     LS1

01BD 0606     SLIN:    MVI     B,6         ;INIT SLURP COUNTER

;MOTOR START AND INTERRUPT SET
               ;SET INT FLAG FOR PHOTO INTERVAL (1.349 SEC) (2.225 IN)
               ;TIMING BASED ON VELOCITY OF 1.65 I.P.S.
```

```
01BF 3A0320          LDA     PHOCNT  ;SEE IF PAPER CUT YET
01C2 FE02            CPI     2       ;IF YES,CHANGE TIME TO REFLECT
01C4 C2D101          JNZ     BM      ;HIGHER SPEED
                                     ;IF NO USE BOTH MOTOR TIME
01C7 3EE6            MVI     A,230
01C9 320720          STA     MS0     ;MOST SIG FOR COUNT0
01CC 3E0A            MVI     A,10
01CE 320820          STA     LS1     ;LEAST SIG. FOR COUNT1

01D1 3E02    BM:     MVI     A,2     ;SET PHOTO INTERRUPT FLAG
01D3 320020          STA     TFLAGS
01D6 3E34            MVI     A,MODE0
01D8 D30B            OUT     TCONT
01DA 3E00            MVI     A,0     ;COUNT0 LSB FOR 1.349 SEC. OR AFTER CUT
01DC D308            OUT     COUNT0
01DE 3A0720          LDA     MS0     ;LOAD MSB
01E1 D308            OUT     COUNT0
01E3 3A0820          LDA     LS1     ;COUNT1 LSB
01E6 D309            OUT     COUNT1
01E8 3E00            MVI     A,0     ;MSB
01EA D309            OUT     COUNT1
01EC 3A0320          LDA     PHOCNT  ;SEE IF PAPER CUT YET
01EF FE03            CPI     3       ;IF COUNT < 3 THEN PAPER IS CUT
01F1 DAF901          JC      MOT2    ;ONLY SECOND PD MOTOR IF CUT
01F4 0EFC            MVI     C,0FCH  ;BOTH IF NOT CUT
01F6 C3FB01          JMP     MSTART
01F9 0EFD    MOT2:   MVI     C,0FDH  ;2ND MOTOR ONLY
01FB DB05    MSTART: IN      SCONT   ;START MOTOR
01FD A1              ANA     C
01FE D305            OUT     SCONT
0200 3E1B            MVI     A,1BH   ;SET INTERRUPT MASK FOR 7.5
0202 30              DB      SIM
0203 FB              EI              ;ENABLE INTERRUPTS

0204 DB02    SL1:    IN      VSTAT   ;LOOK FOR BLANKING (V SYNC, REALLY)
0206 E610            ANI     10H
0208 CA0402          JZ      SL1

020B DB01            IN      HBUMP   ;SLURP
020D 3D              DCR     A
020E D301            OUT     HBUMP

;PLAY A TONE THEN IT'S OCTAVE NOTE 0210 7E              MOV     A,M     ;GET NOTE FROM TABLE (LSB)
0211 D30A            OUT     COUNT2  ;LOAD SCALE VALUE IN COUNTER
0213 23              INX     H       ;MSB OF NOTE VALUE
0214 7E              MOV     A,M
0215 D30A            OUT     COUNT2
0217 CDFE09          CALL    NOTE    ;PLAY IT
021A CDFE09          CALL    NOTE    ;TWO STANDARD LENGTHS
021D 23              INX     H       ;TO LSBYTE OF NEXT NOTE 021E 7E              MOV     A,M     ;GET NOTE FROM TABLE (LSB)
021F D30A            OUT     COUNT2  ;LOAD SCALE VALUE IN COUNTER
0221 23              INX     H       ;MSB OF NOTE VALUE
0222 7E              MOV     A,M
0223 D30A            OUT     COUNT2
0225 CDFE09          CALL    NOTE    ;PLAY IT
0228 CDFE09          CALL    NOTE    ;TWO STANDARD LENGTHS
022B 23              INX     H 022C 05              DCR     B       ;TIME FOR NEXT EXPOSURE?
022D C20402          JNZ     SL1

0230 CD320A          CALL    QUIET   ;SSHHH

0233 CDD708          CALL    EXP     ;EXPOSE 0236 3A0320          LDA     PHOCNT  ;GET PICTURE COUNT
0239 FE03            CPI     3       ;TIME TO CUT?
```

```
023B CC4909           CZ      SKOOCUT   ;SKOOTCH AND CUT
023E 0606             MVI     B,6       ;PATCH IN SLURP COUNT
0240 3A0320           LDA     PHOCNT
0243 3D               DCR     A         ;DECREMENT PHOTO COUNTER
0244 320320           STA     PHOCNT
0247 FE02             CPI     2         ;FIRST AFTER CUT?
0249 CA0402           JZ      SL1       ;SKIP PAPER ADVANCE (ALREADY THERE)
024C 3A0320           LDA     PHOCNT
024F FE00             CPI     0         ;DONE?
0251 CAE402           JZ      EXDONE
0254 C3BD01           JMP     SLIN      ;ANOTHER 4 SLURPS + EXPOSURE

;JMP HERE FOR REGULAR PHOTOS

0257 CD8D07   REGULAR:CALL    ERASE     ;ERASE TEXT
025A CD9E07           CALL    BLANK     ;BLANK SCREEN 025D 3E23             MVI     A,023H    ;ENSURE ADC IS SOURCE
025F D300             OUT     VCONT     ;"LIVE" PICTURE

0261 CDCD07           CALL    POSE      ;COUNTDOWN AND FREEZE

0264 CD9B09           CALL    SKOOTCH   ;SKOOTCH PAPER 2 IN.

0267 CDD708           CALL    EXP       ;EXPOSE FOR 10 SECONDS
026A 3E03             MVI     A,3       ;INIT PHOTO COUNTER
026C 320320           STA     PHOCNT 026F 3EEB             MVI     A,235     ;LOAD DRIVE TIMES
0271 320720           STA     MS0
0274 3E0A             MVI     A,10
0276 320820           STA     LS1

0279 3E23     REGL:   MVI     A,023H    ;"LIVE" PICTURE
027B D300             OUT     VCONT

;MOTOR START AND INTERRUPT SET
                ;SET INT FLAG FOR PHOTO INTERVAL (1.209 SEC) (2.225 IN)

027D 3A0320           LDA     PHOCNT    ;SEE IF PAPER CUT YET
0280 FE02             CPI     2         ;IF YES,CHANGE TIME TO REFLECT
0282 C28F02           JNZ     BMR       ;HIGHER SPEED
                                        ;IF NO USE BOTH MOTOR TIME
0285 3EE6             MVI     A,230
0287 320720           STA     MS0       ;MOST SIG FOR COUNT0
028A 3E0A             MVI     A,10
028C 320820           STA     LS1       ;LEAST SIG. FOR COUNT1

028F 3E02     BMR:    MVI     A,2       ;SET PHOTO INTERRUPT FLAG
0291 320020           STA     TFLAGS
0294 3E34             MVI     A,MODE0
0296 D30B             OUT     TCONT
0298 3E00             MVI     A,0       ;COUNT0 LSB FOR 1.45 SEC.
029A D308             OUT     COUNT0
029C 3A0720           LDA     MS0       ;MSB
029F D308             OUT     COUNT0
02A1 3A0820           LDA     LS1       ;COUNT1 LSB
02A4 D309             OUT     COUNT1
02A6 3E00             MVI     A,0       ;MSB
02A8 D309             OUT     COUNT1
02AA 3A0320           LDA     PHOCNT    ;SEE IF PAPER CUT YET
02AD FE03             CPI     3         ;IF COUNT < 3 THEN PAPER IS CUT
02AF DAB702           JC      RMOT2     ;ONLY SECOND PD MOTOR IF CUT
02B2 0EFC             MVI     C,0FCH    ;BOTH IF NOT CUT
02B4 C3B902           JMP     RMSTRT
02B7 0EFD     RMOT2:  MVI     C,0FDH    ;2ND MOTOR ONLY
02B9 DB05     RMSTRT: IN      SCONT     ;START MOTOR
02BB A1               ANA     C
02BC D305             OUT     SCONT
```

```
02BE 3E1B            MVI     A,1BH    ;SET INTERRUPT MASK FOR 7.5
02C0 30              DB      SIM
02C1 FB              EI               ;ENABLE INTERRUPTS

02C2 CD4A08   NOMOV: CALL    POSE234  ;POSE ROUTINE USING 1.45 SEC PAPER FEED

02C5 CDD708          CALL    EXP

02C8 3A0320          LDA     PHOCNT   ;THIRD PICTURE IN POSITION?
02CB FE03            CPI     3        ;TIME TO CUT?
02CD CC4909          CZ      SKOOCUT  ;SKOOTCH AND CUT
02D0 3A0320          LDA     PHOCNT
02D3 3D              DCR     A        ;ONE MORE PHOTO DONE
02D4 320320          STA     PHOCNT
02D7 FE02            CPI     2        ;FIRST AFTER CUT?
02D9 CAC202          JZ      NOMOV    ;DON'T ADVANCE PAPER
02DC 3A0320          LDA     PHOCNT
02DF FE00            CPI     0
02E1 C27902          JNZ     REGL

;SET MOTOR INT FOR LOGO PHOTO
              ;MOTOR START AND INTERRUPT SET
              ;SET INT FLAG FOR PHOTO INTERVAL (1.3 SEC) (2.225 IN)

02E4 3E02    EXDONE: MVI     A,2      ;SET PHOTO INTERRUPT FLAG
02E6 320020          STA     TFLAGS
02E9 3E34            MVI     A,MODE0
02EB D30B            OUT     TCONT
02ED 3E00            MVI     A,0      ;COUNT0 LSB FOR 1.45 SEC.
02EF D308            OUT     COUNT0
02F1 3EE6            MVI     A,230    ;MSB
02F3 D308            OUT     COUNT0
02F5 3E0A            MVI     A,10     ;COUNT1 LSB
02F7 D309            OUT     COUNT1
02F9 3E00            MVI     A,0      ;MSB
02FB D309            OUT     COUNT1
02FD DB05            IN      SCONT    ;START MOTOR
02FF E6FD            ANI     0FDH     ;2ND MOTOR ONLY
0301 D305            OUT     SCONT
0303 3E1B            MVI     A,1BH    ;SET INTERRUPT MASK FOR 7.5
0305 30              DB      SIM
0306 FB              EI               ;ENABLE INTERRUPTS

;WAIT FOR MOTOR STOP INTERRUPT (1.45 SEC. WE HOPE)

0307 76      MWAIT:  HLT 0308 3E7F            MVI     A,127    ;FULL SCREEN
030A D301            OUT     HBUMP

;FILL TEXT BUFFER WITH BLACK SPACES 030C 210040          LXI     H,4000H  ;START OF TEXT BUFFER
030F 0EA0            MVI     C,0A0H   ;BLACK SPACE CHAR.
0311 71      BLK:    MOV     M,C
0312 23              INX     H
0313 7C              MOV     A,H
0314 FE42            CPI     42H
0316 C21103          JNZ     BLK

;EXPOSE MESSAGE AND DATE ON FILM 0319 11030F          LXI     D,STAMP1 ;MESSAGE ON PHOTOS
031C 212740          LXI     H,4027H  ;FIRST SCREEN LOCATION
031F CD6F06          CALL    BLNOUT   ;WRITE TO SCREEN BUFFER
0322 11140F          LXI     D,STAMP2 ;NEXT LINE
0325 218040          LXI     H,4080H  ;TRIPLE SPACED
0328 CD6F06          CALL    BLNOUT
032B 11270F          LXI     D,STAMP3
032E 21C840          LXI     H,40C8H
0331 CD6F06          CALL    BLNOUT
```

```
0334 113C0F           LXI     D,STAMP4
0337 212841           LXI     H,4128H
033A CD6F06           CALL    BLNOUT

;SET RTC FOR 64TH SEC. PULSES

033D CDDB05           CALL    PULSE64

0340 DB00             IN      VCONT     ;MIRROR MODE
0342 F604             ORI     4
0344 D300             OUT     VCONT

0346 DB02             IN      TEXCON    ;TURN ON EXPOSURE TEXT AND
0348 F606             ORI     06H       ;REVERSE CHARACTERS
034A D302             OUT     TEXCON

;UN-BLANK EXPOSURE MONITOR SO TEXT NICE AND BRIGHT

034C DB00             IN      VCONT
034E F608             ORI     8
0350 D300             OUT     VCONT

;TWO SLURPS ON DISPLAY MONITOR TO ENTERTAIN WHILE EXPOSING LOGO 0352 0602             MVI     B,2       ;TWO TIMES THRU
0354 21F70A   SHL222: LXI     H,TABLE

0357 DB02     SHLURP: IN      VSTAT     ;LOOK FOR BLANKING (V SYNC, REALLY)
0359 E610             ANI     10H
035B CA5703           JZ      SHLURP

035E DB01             IN      HBUMP     ;SLURP
0360 3D               DCR     A
0361 D301             OUT     HBUMP

;PLAY A TONE THEN IT'S OCTAVE NOTE 0363 7E               MOV     A,M       ;GET NOTE FROM TABLE (LSB)
0364 D30A             OUT     COUNT2    ;LOAD SCALE VALUE IN COUNTER
0366 23               INX     H         ;MSB OF NOTE VALUE
0367 7E               MOV     A,M
0368 D30A             OUT     COUNT2
036A CDFE09           CALL    NOTE      ;PLAY IT
036D 23               INX     H         ;TO LSBYTE OF NEXT NOTE 036E 7E               MOV     A,M       ;GET NOTE FROM TABLE (LSB)
036F D30A             OUT     COUNT2    ;LOAD SCALE VALUE IN COUNTER
0371 23               INX     H         ;MSB OF NOTE VALUE
0372 7E               MOV     A,M
0373 D30A             OUT     COUNT2
0375 CDFE09           CALL    NOTE      ;PLAY IT
0378 23               INX     H

0379 DB01             IN      HBUMP
037B FE60             CPI     96        ;SLURPED IN FAR ENOUGH?
037D C25703           JNZ     SHLURP    ;IF NOT, REPEAT 0380 2B               DCX     H         ;POINT TO MSB OF HI WATER NOTE
                                        ;GETS TABLE POINTER IN PHASE
                                        ;FOR DECREMENT

0381 DB02     SHLOUT: IN      VSTAT     ;LOOK FOR BLANKING (V SYNC, REALLY)
0383 E610             ANI     10H
0385 CA8103           JZ      SHLOUT

0388 DB01             IN      HBUMP     ;UNSLURP
038A 3C               INR     A
038B D301             OUT     HBUMP

;PLAY A TONE AND IT'S HALF OCTAVE 038D 2B               DCX     H         ;POINT TO LSB
```

```
038E 7E                    MOV     A,M         ;GET NOTE FROM TABLE (LSB)
038F D30A                  OUT     COUNT2      ;LOAD SCALE VALUE IN COUNTER
0391 23                    INX     H           ;MSB OF NOTE VALUE
0392 7E                    MOV     A,M
0393 D30A                  OUT     COUNT2
0395 CDFE09                CALL    NOTE        ;PLAY IT 0398 2B                    DCX     H           ;POINT TO  B 0399 7E                    MOV     A,M         ;GET NOTE FROM TABLE (LSB)
039A D30A                  OUT     COUNT2      ;LOAD SCALE VALUE IN COUNTER
039C 23                    INX     H           ;MSB OF NOTE VALUE
039D 7E                    MOV     A,M
039E D30A                  OUT     COUNT2
03A0 CDFE09                CALL    NOTE        ;PLAY IT
03A3 2B                    DCX     H           ;BACK UP ONE NOTE (2 BYTES)
03A4 2B                    DCX     H

03A5 DB01                  IN      HBUMP
03A7 FE7F                  CPI     127         ;SLURPED OUT ALL THE WAY?
03A9 C28103                JNZ     SHLOUT      ;IF NOT, REPEAT

03AC CD320A                CALL    QUIET       ;SSHHH

03AF 05                    DCR     B           ;2ND TIME OVER?
03B0 C25403                JNZ     SHL222

03B3 DB02                  IN      TEXCON      ;BLANK EXP TEXT
03B5 E6F0                  ANI     0F0H
03B7 D302                  OUT     TEXCON

;BLANK EXPOSURE MONITOR

03B9 DB00                  IN      VCONT
03BB E6F7                  ANI     0F7H
03BD D300                  OUT     VCONT

;FEED TO HEATER
                ;MOTOR START
                ;SET TIMER FOR HTR FEED INTERVAL (4 SEC)

03BF 3E34                  MVI     A,MODE0
03C1 D30B                  OUT     TCONT
03C3 3E00                  MVI     A,0         ;COUNT0 LSB
03C5 D308                  OUT     COUNT0
03C7 3E00                  MVI     A,0         ;MSB
03C9 D308                  OUT     COUNT0
03CB 3E28                  MVI     A,40        ;COUNT1 LSB
03CD D309                  OUT     COUNT1
03CF 3E00                  MVI     A,0         ;MSB
03D1 D309                  OUT     COUNT1
03D3 DB05                  IN      SCONT       ;START MOTOR
03D5 E6FD                  ANI     0FDH        ;2ND MOTOR ONLY
03D7 D305                  OUT     SCONT

03D9 CDFC0D                CALL    BYE         ;TELL THEM PICTURE WILL BE COMING

03DC E5                    PUSH    H           ;SAVE POINTER
03DD 21CD0A                LXI     H,TUNE3
03E0 CDE109                CALL    PLAY        ;LITTLE SIGN-OFF TUNE
03E3 E1                    POP     H           ;RESTORE POINTER

03E4 DB06      FWAIT:      IN      RCONT       ;WAIT FOR FINAL FEED
03E6 E610                  ANI     10H         ;TIMER OUT?
03E8 CAE403                JZ      FWAIT

;TURN OFF MOTOR

03EB DB05                  IN      SCONT
03ED F603                  ORI     3
03EF D305                  OUT     SCONT
```

```
                    ;SET RTC FOR 1 SECOND PULSES

03F1 CDED05             CALL    PULSE1

;FLASH RIGHT ARROW (LEFT TO CUSTOMER)

03F4 3E06               MVI     A,6         ;STAY IN THIS LOOP 12 SEC
03F6 320420             STA     BFCNT       ;

03F9 CDB50D     BYFLASH:CALL    BFDEL       ;DELAY 2 SEC.
03FC CD1204             CALL    RARROW
03FF CDB50D             CALL    BFDEL       ;DELAY
0402 CD3E07             CALL    BLANKA      ;BLANK ARROW
0405 3A0420             LDA     BFCNT
0408 3D                 DCR     A
0409 320420             STA     BFCNT       ;12 SEC. UP?
040C CA3A04             JZ      OVER        ;ALL DONE
040F C3F903             JMP     BYFLASH

0412 CD5207     RARROW: CALL    TOFF        ;TURN OFF TEXT
0415 217841             LXI     H,4178H     ;START OF LEFT ARROW
0418 117B07             LXI     D,A4        ;POINT TO FIRST HOR ROW
041B 0E06               MVI     C,6         ;FOUR CHAR GRAPH STRING
041D CD6007             CALL    GRAPH
0420 219841             LXI     H,4198H     ;NEXT ROW
0423 118107             LXI     D,A5
0426 0E06               MVI     C,6
0428 CD6007             CALL    GRAPH
042B 21B841             LXI     H,41B8H
042E 118707             LXI     D,A6
0431 0E06               MVI     C,6
0433 CD6007             CALL    GRAPH
0436 CD5907             CALL    TON
0439 C9                 RET

;
                        ;WAIT X SECONDS 'TIL PICTURE SHOULD BE READY
                        ;RE-INITITIALIZE ANY POINTERS,FLAGS,ETC.
                ;
                ;
                ;
043A C32E01     OVER:    JMP    MAIN        ;BACK TO MAIN

;SUBS GO HERE

043D DB04       SSW:    IN      SSTAT       ;LOOK FOR SERVICE MODE REQ.
043F E620               ANI     20H
0441 CA4504             JZ      GOSERVE
0444 C9                 RET

0445 F1         GOSERVE:POP PSW             ;RESTORE SP
0446 C32A0E             JMP     SERVICE

0449 DB06       DATE:   IN      RCONT       ;LOOK FOR RTC PULSE
044B E620               ANI     20H
044D C24904             JNZ     DATE

0450 DB06               IN      RCONT       ;ENABLE RTC ACCESS
0452 F608               ORI     8
0454 D306               OUT     RCONT
0456 00                 NOP 0457 3E05               MVI     A,HOLD      ;HOLD RTC
0459 D32D               OUT     CLKCOND
045B DB2D       SBUSY:  IN      CLKCOND     ;BUSY?
045D E602               ANI     BUSY
045F C25B04             JNZ     SBUSY

0462 DB02               IN      TEXCON      ;TURN OFF TEXT AND B/W
0464 E6FC               ANI     0FCH        ;TO AVOID SPLOTCHES ON SCREEN
0466 D302               OUT     TEXCON
```

```
0468 DB29              IN      TMONTH   ;GET MONTH
046A 320920            STA     TM

046D DB28              IN      MONTH    ;GET MONTH
046F 320A20            STA     MM

0472 DB27              IN      TDAY     ;GET DAY
0474 320B20            STA     TD

0477 DB26              IN      DAY      ;GET DAY
0479 320C20            STA     DD

047C DB2B              IN      TYEAR    ;GET YEAR
047E 320D20            STA     TY

0481 DB2A              IN      YEAR     ;GET YEAR
0483 320E20            STA     Y 0486 3E00              MVI     A,0
0488 D32D              OUT     CLKCOND  ;UNHOLD RTC

048A DB06              IN      RCONT    ;DISABLE RTC ACCESS
048C E6F7              ANI     0F7H
048E D306              OUT     RCONT
0490 00                NOP

0491 C9                RET 0492 110920   PDATE:   LXI     D,TM     ;LOOK AT TENS OF MONTH
0495 0E00              MVI     C,0
0497 1A                LDAX    D
0498 E601              ANI     01H
049A FE00              CPI     0        ;LESS THAN TEN?
049C CAA104            JZ      LTEN
049F 0E0A              MVI     C,10
04A1 13       LTEN:    INX     D        ;POINT TO MONTHS
04A2 1A                LDAX    D
04A3 E60F              ANI     0FH
04A5 81                ADD     C        ;ADD TENS TO MONTHS
04A6 4F                MOV     C,A

04A7 110305            LXI     D,MONTHS ;POINT TO TABLE OF MONTH NAMES

04AA AF                XRA     A        ;LOOK FOR MONTH COUNT
04AB B9                CMP     C        ;ZERO?
04AC CABB04            JZ      PMONTH

04AF 13       MLOOP:   INX     D        ;LOOK FOR '%' CHAR.
04B0 1A                LDAX    D        ;WHEN FOUND, DCR C AND SEE IF THERE
04B1 FE25              CPI     '%'
04B3 C2AF04            JNZ     MLOOP
04B6 0D                DCR     C
04B7 C2AF04            JNZ     MLOOP
04BA 13                INX     D        ;WHEN THERE,POINT TO FIRST CHAR

04BB 216841   PMONTH:  LXI     H,4168H  ;SCREEN LOC FOR DATE START

04BE 1A       PPUT:    LDAX    D        ;GET CHAR
04BF FE25              CPI     '%'      ;END OF MONTH NAME?
04C1 CACC04            JZ      PDAY
04C4 F680              ORI     80H      ;BLACK BCKGRND
04C6 77                MOV     M,A      ;PRINT TO SCREEN
04C7 23                INX     H
04C8 13                INX     D
04C9 C3BE04            JMP     PPUT

04CC 3EA0    PDAY:     MVI     A,0A0H   ;SPACE CHAR
04CE 77                MOV     M,A
04CF 23                INX     H
04D0 3A0B20            LDA     TD       ;GET TENS OF DAYS
04D3 E603              ANI     03H
04D5 CD0A06            CALL    TPRINT
```

```
04D8 3A0C20            LDA    DD
04DB E60F              ANI    0FH
04DD CD0A06            CALL   TPRINT
04E0 3EAC              MVI    A,0ACH      ;COMMA
04E2 77                MOV    M,A
04E3 23                INX    H
04E4 3EA0              MVI    A,0A0H      ;SPACE
04E6 77                MOV    M,A
04E7 23                INX    H
04E8 3E01              MVI    A,1         ;'1' IN '19__'
04EA CD0A06            CALL   TPRINT
04ED 3E09              MVI    A,9
04EF CD0A06            CALL   TPRINT
04F2 3A0D20            LDA    TY          ;GET TENS OF YEAR DIGIT
04F5 E60F              ANI    0FH
04F7 CD0A06            CALL   TPRINT
04FA 3A0E20            LDA    Y           ;GET YEAR DIGIT
04FD E60F              ANI    0FH
04FF CD0A06            CALL   TPRINT
0502 C9                RET 0503 4A414E2E25 MONTHS: DB    'JAN.%FEB.%MARCH%APRIL%MAY%JUNE%JULY%AUG.%'
052C 534550542E        DB    'SEPT.%OCT.%NOV.%DEC.%'

0541 3E34     DELAY:   MVI    A,MODE0
0543 D30B              OUT    TCONT
0545 3E00              MVI    A,0         ;SET TIMER FOR 2 SECONDS
0547 D308              OUT    COUNT0
0549 3E00              MVI    A,0
054B D308              OUT    COUNT0
054D 3E12              MVI    A,18
054F D309              OUT    COUNT1
0551 3E00              MVI    A,0
0553 D309              OUT    COUNT1
0555 DB06     LOOP:    IN     RCONT       ;TIME OUT?
0557 E610              ANI    10H         ;TIMER BIT 4
0559 CA5505            JZ     LOOP
055C C9                RET

VINIT:   ;INIT 5027 CRT CONTROLLER AND VIDEO CONTROL PORTS
055D AF                XRA    A
055E D31E              OUT    BTC
0560 D31A              OUT    RESET
0562 3E9F              MVI    A,159D      ;REG0 = TOTAL HOR. CHAR. COUNT -
0564 D310              OUT    REG0        ;(132 CHAR. + 7 CHAR. H SYNC DELA
                                          ;+ 15 CHAR. SYNC PULSE + 5 CHAR.
                                          ;DELAY) (160-1)

0566 3EF9              MVI    A,0F9H      ;INTERLACE FLAG + H SYNC WIDTH(15
0568 D311              OUT    REG1        ;+ H SYNC DELAY(7 CH.)

056A 3E7F              MVI    A,7FH       ;SCANS PER DATA ROW(16) + CHAR. F
056C D312              OUT    REG2        ;DATA ROW (132) [ 7 FROM TABLE ]

056E 3EDD              MVI    A,0DDH      ;SKEW BITS(0) + DATA ROWS PER FRA
0570 D313              OUT    REG3        ;MINUS 1

0572 3E04              MVI    A,4         ;SCAN LINES PER FRAME(521) "4" DE
0574 D314              OUT    REG4        ;FROM FORMULA 0576 3E0E              MVI    A,0EH       ;VERT. DATA START (14) SCAN LINES
0578 D315              OUT    REG5

057A 3E1D              MVI    A,1DH       ;LAST DISPLAYED ROW (30) -1
057C D316              OUT    REG6

057E D31E              OUT    BTC         ;START COMMAND TO 5027

0580 C9                RET

;INIT RTC
```

```
0581 DB06        RTINIT: IN     RCONT    ;ENABLE RTC ACCESS
0583 F608                ORI    8
0585 D306                OUT    RCONT
0587 00                  NOP             ;WAIT FOR RTC TO SETTLE ( > 1 MI( 0588 3E05                MVI    A,HOLD   ;HOLD RTC FOR INIT REGISTERS
058A D32D                OUT    CLKCOND
058C 3E00                MVI    A,0      ;STD PULSES (NON-INTR)
058E F604                ORI    ESEC     ;PULSE EVERY SEC
0590 D32E                OUT    CLKCONE
0592 3E04                MVI    A,4      ;NORMAL 24 HOUR CLK OPERATION
0594 D32F                OUT    CLKCONF

0596 DB2D       CBUSY:   IN     CLKCOND  ;BUSY BIT SET?
0598 E602                ANI    BUSY
059A C29605              JNZ    CBUSY 059D 3E00                MVI    A,0
059F D320                OUT    SEC
05A1 D321                OUT    TSEC
05A3 3E00                MVI    A,0
05A5 D322                OUT    MIN
05A7 3E00                MVI    A,0
05A9 D323                OUT    TMIN
05AB 3E00                MVI    A,0
05AD D324                OUT    HOUR
05AF 3E00                MVI    A,0
05B1 D325                OUT    THOUR
05B3 3E04                MVI    A,4
05B5 D326                OUT    DAY
05B7 3E00                MVI    A,0
05B9 D327                OUT    TDAY
05BB 3E02                MVI    A,2
05BD D328                OUT    MONTH
05BF 3E00                MVI    A,0
05C1 D329                OUT    TMONTH
05C3 3E06                MVI    A,6
05C5 D32A                OUT    YEAR
05C7 3E08                MVI    A,8
05C9 D32B                OUT    TYEAR
05CB 3E01                MVI    A,1
05CD D32C                OUT    WEEK

05CF 3E00       UNHOLD:  MVI    A,0
05D1 D32D                OUT    CLKCOND

05D3 DB06                IN     RCONT    ;DISABLE RTC/BUS ACCESS
05D5 E6F7                ANI    0F7H
05D7 D306                OUT    RCONT
05D9 00                  NOP
05DA C9                  RET

;SET RTC FOR 1/64 SECOND PULSES

05DB DB06       PULSE64: IN     RCONT    ;ENABLE RTC ACCESS
05DD F608                ORI    8
05DF D306                OUT    RCONT
05E1 00                  NOP

05E2 3E00                MVI    A,E64TH  ;SET FOR PULSE EVERY 1/64 SEC
05E4 D32E                OUT    CLKCONE

05E6 DB06                IN     RCONT    ;DISABLE RTC ACCESS
05E8 E6F7                ANI    0F7H
05EA D306                OUT    RCONT
05EC C9                  RET

;SET RTC FOR 1 SECOND PULSES

05ED DB06       PULSE1:  IN     RCONT    ;ENABLE RTC ACCESS
05EF F608                ORI    8
05F1 D306                OUT    RCONT
05F3 00                  NOP
```

```
05F4 3E04              MVI     A,ESEC     ;SET FOR PULSE EVERY SEC
05F6 D32E              OUT     CLKCONE

05F8 DB06   BWAIT:     IN      RCONT      ;WAIT FOR PULSE TO INIT TIMING
05FA E620              ANI     20H
05FC C2F805            JNZ     BWAIT
05FF 3E00              MVI     A,0        ;RESET IRQ FLAG
0601 D32D              OUT     CLKCOND

0603 DB06              IN      RCONT      ;DISABLE RTC ACCESS
0605 E6F7              ANI     0F7H
0607 D306              OUT     RCONT

0609 C9               RET

060A E60F   TPRINT:    ANI     0FH        ;PREPS AND PRINTS NUMERIC CHAR.
060C F6B0              ORI     0B0H
060E 77                MOV     M,A
060F 23                INX     H
0610 C9                RET 0611 36A0   SPACE:     MVI     M,0A0H     ;SPACE
0613 3E00              MVI     A,0
0615 23                INX     H
0616 C9                RET

0617 CD8D07 SELECT:    CALL    ERASE      ;VIRGIN SCREEN
061A CD9E07            CALL    BLANK
061D 214A40            LXI     H,404AH    ;START POSITION OF MESSAGE
0620 117B06            LXI     D,SEL1     ;POINT TO FIRST LINE OF MESS.
0623 CD6506            CALL    LINEOUT    ;PRINT LINE
0626 218B40            LXI     H,408BH
0629 118806            LXI     D,SEL2     ;NEXT LINE
062C CD6506            CALL    LINEOUT
062F 21E540            LXI     H,40E5H    ;NEXT
0632 119306            LXI     D,SEL3
0635 CD6506            CALL    LINEOUT
0638 210541            LXI     H,4105H    ;NEXT
063B 11AB06            LXI     D,SEL4
063E CD6506            CALL    LINEOUT

0641 DB02              IN      TEXCON     ;ENABLE TEXT DISPLAY
0643 F601              ORI     1
0645 D302              OUT     TEXCON 0647 3E0A              MVI     A,10       ;STAY IN THIS LOOP 10 SEC OR
0649 320520            STA     FLCNT      ;'TIL SELECTION MADE

064C CDC306 FLASH:     CALL    FDEL       ;DELAY 1 SEC.
064F CDF506            CALL    ARROWS
0652 CDC306            CALL    FDEL       ;DELAY
0655 CD3E07            CALL    BLANKA     ;BLANK ARROWS
0658 3A0520            LDA     FLCNT
065B 3D                DCR     A          ;TEN SEC. UP?
065C 320520            STA     FLCNT
065F CA7F01            JZ      FUNNY      ;DEFAULT TO FUNNY FACES
0662 C34C06            JMP     FLASH 0665 1A     LINEOUT:LDAX      D           ;GET CHAR
0666 FE25              CPI     '%'        ;END OF LINE?
0668 C8                RZ
0669 77                MOV     M,A
066A 23                INX     H
066B 13                INX     D
066C C36506            JMP     LINEOUT 066F 1A     BLNOUT:    LDAX    D          ;GET CHAR
0670 FE25              CPI     '%'        ;END OF LINE?
0672 C8                RZ
0673 F680              ORI     80H        ;BLK BACKGROUND
0675 77                MOV     M,A
0676 23                INX     H
```

```
0677 13                    INX     D
0678 C36F06                JMP     BLNOUT 067B 4E4F545455SEL1:       DB      'NOTTUB HSUP %'
0688 45534F4F48SEL2:       DB      'ESOOHC OT %'
0693 52414C5547SEL3:       DB      'RALUGER         YNNUF %'
06AB 20534F544FSEL4:       DB      ' SOTOHP         SECAF %'

06C3 3E00      FDEL:       MVI     A,0       ;SET TIMER FOR 1 SECOND
06C5 D308                  OUT     COUNT0
06C7 3E00                  MVI     A,0
06C9 D308                  OUT     COUNT0
06CB 3E0A                  MVI     A,10
06CD D309                  OUT     COUNT1
06CF 3E00                  MVI     A,0
06D1 D309                  OUT     COUNT1

06D3 DB04      FL1:        IN      SSTAT     ;LOOK FOR SELECT SWITCHES
06D5 E602                  ANI     2         ;FUNNY FACE?
06D7 C2E006                JNZ     RCHEK     ;NOPE LOOK FOR REGULAR
06DA 310024                LXI     SP,2400H  ;RESTORE STACK POINTER
06DD C37F01                JMP     FUNNY     ;AND JUMP TO FUNNY
06E0 DB04      RCHEK:      IN      SSTAT
06E2 E604                  ANI     4         ;REGULAR?
06E4 C2ED06                JNZ     TCHEK
06E7 310024                LXI     SP,2400H
06EA C35702                JMP     REGULAR
06ED DB06      TCHEK:      IN      RCONT     ;LOOK FOR TIME-OUT
06EF E610                  ANI     10H
06F1 CAD306                JZ      FL1
06F4 C9                    RET

06F5 CD5207    ARROWS:     CALL    TOFF      ;TURN OFF TEXT
06F8 214441                LXI     H,4144H   ;START OF LEFT ARROW
06FB 116907                LXI     D,A1      ;POINT TO FIRST HOR ROW
06FE 0E06                  MVI     C,6       ;SIX CHAR GRAPH STRING
0700 CD6007                CALL    GRAPH
0703 216441                LXI     H,4164H   ;NEXT ROW
0706 116F07                LXI     D,A2
0709 0E06                  MVI     C,6
070B CD6007                CALL    GRAPH
070E 218441                LXI     H,4184H
0711 117507                LXI     D,A3
0714 0E06                  MVI     C,6
0716 CD6007                CALL    GRAPH
0719 215841                LXI     H,4158H   ;START OF RIGHT ARROW
071C 117B07                LXI     D,A4      ;POINT TO FIRST HOR ROW
071F 0E06                  MVI     C,6       ;SIX CHAR GRAPH STRING
0721 CD6007                CALL    GRAPH
0724 217841                LXI     H,4178H   ;NEXT ROW
0727 118107                LXI     D,A5
072A 0E06                  MVI     C,6
072C CD6007                CALL    GRAPH
072F 219841                LXI     H,4198H
0732 118707                LXI     D,A6
0735 0E06                  MVI     C,6
0737 CD6007                CALL    GRAPH
073A CD5907                CALL    TON       ;TURN ON TEXT
073D C9                    RET

073E CD5207    BLANKA:     CALL    TOFF      ;TURN OFF TEXT
0741 214041                LXI     H,4140H
0744 0E20                  MVI     C,20H
0746 71        BLOOP:      MOV     M,C       ;OUTPUT BLANKS
0747 23                    INX     H         ;FROM ARROW ON DOWN
0748 7C                    MOV     A,H
0749 FE42                  CPI     42H
074B C24607                JNZ     BLOOP
074E CD5907                CALL    TON       ;TURN ON TEXT
0751 C9                    RET

0752 DB02     TOFF:        IN      TEXCON    ;TURN OFF TEXT (DISPLAY MONITOR)
```

```
0754 E6FE               ANI     0FEH
0756 D302               OUT     TEXCON
0758 C9                 RET

0759 DB02       TON:    IN      TEXCON      ;TURN ON TEXT (DISPLAY MONITOR)
075B F601               ORI     1
075D D302               OUT     TEXCON
075F C9                 RET 0760 1A         GRAPH:  LDAX    D           ;GET GRAPHICS CHAR.
0761 77                 MOV     M,A         ;PRINT TO SCREEN
0762 23                 INX     H
0763 13                 INX     D
0764 0D                 DCR     C
0765 C26007             JNZ     GRAPH
0768 C9                 RET 0769 0000000D0EA1:      DB      0,0,0,0DH,0EH,0FH
076F 100D0E0F11A2:      DB      10H,0DH,0EH,0FH,11H,0
0775 1213140000A3:      DB      12H,13H,14H,0,0,0

077B 0302010000A4:      DB      3,2,1,0,0,0
0781 0005030201A5:      DB      0,5,3,2,1,4
0787 0000000807A6:      DB      0,0,0,8,7,6

078D CD5207     ERASE:  CALL    TOFF        ;TURN OFF TEXT (DISPLAY)
0790 210040             LXI     H,4000H     ;POINT TO TEXT BUFFER
0793 0E20               MVI     C,20H       ;SPACE CHAR 0795 71         SPLOOP: MOV     M,C
0796 23                 INX     H
0797 7C                 MOV     A,H
0798 FE42               CPI     42H         ;SCREEN FILLED WITH BLANKS?
079A C29507             JNZ     SPLOOP
079D C9                 RET

079E DB00      BLANK:   IN      VCONT       ;GET CURRENT VID CONTROL WORD
07A0 E6D7               ANI     0D7H        ;DISPLAY AND EXPOSE BITS LOW
07A2 D300               OUT     VCONT
07A4 C9                 RET

;       ROUTINE TO WRITE BORDER ON SCREEN

07A5 210040     BORDER: LXI     H,4000H     ;POINT TO SCREEN MAP

07A8 3E80       DRAW:   MVI     A,80H       ;BLACK CHAR
07AA 0E06               MVI     C,6         ;CNTDWN
07AC 77         DROOP:  MOV     M,A         ;PUT IN SCREEN MAP
07AD 23                 INX     H
07AE 0D                 DCR     C
07AF C2AC07             JNZ     DROOP
07B2 0E10       WINDOW: MVI     C,16        ;DO NOTHING IN MIDDLE OF SCREEN
07B4 23         WLOOP:  INX     H
07B5 0D                 DCR     C
07B6 C2B407             JNZ     WLOOP
07B9 3E80       DRAW2:  MVI     A,80H
07BB 0E0A               MVI     C,10
07BD 77         DROOP2: MOV     M,A
07BE 23                 INX     H
07BF 0D                 DCR     C
07C0 C2BD07             JNZ     DROOP2

07C3 7C                 MOV     A,H         ;DONE?
07C4 FE42               CPI     42H
07C6 C2A807             JNZ     DRAW

07C9 CD5907             CALL    TON         ;TEXT ON
07CC C9                 RET

;POSE ROUTINE

07CD DB02       POSE:   IN      VSTAT       ;VERT SYNC
```

```
07CF E610              ANI    10H
07D1 CACD07            JZ     POSE
07D4 DB02              IN     TEXCON   ;TEXT OFF WHILE WRITING
07D6 E6FE              ANI    0FEH
07D8 D302              OUT    TEXCON
07DA 114A0F            LXI    D,PMESS1 ;POSE MESSAGE
07DD 214C41            LXI    H,414CH  ;START OF LINE ON SCREEN
07E0 CD6506            CALL   LINEOUT  ;PRINT ON DISPLAY SCREEN
07E3 216F41            LXI    H,416FH  ;COUNTDOWN NUMBER LOCATION
07E6 3E07              MVI    A,7      ;INITIAL COUNTDOWN VALUE
07E8 CD0A06            CALL   TPRINT   ;NUMERAL OUTPUT ROUTINE
07EB 36A0              MVI    M,0A0H   ;BLACK SPACE
07ED 11540F            LXI    D,PMESS2 ;THIRD PART OF MESSAGE
07F0 218841            LXI    H,4188H  ;START OF THIRD LINE
07F3 CD6506            CALL   LINEOUT
07F6 CD5907            CALL   TON      ;TEXT BACK ON

;SET RTC FOR 1 SECOND PULSES

07F9 CDED05            CALL   PULSE1

07FC DB05              IN     SCONT    ;START PAPER FEED
07FE E6FC              ANI    0FCH
0800 D305              OUT    SCONT
0802 0E07              MVI    C,7      ;COUNTDOWN FROM 7 SEC.

0804 216F41            LXI    H,416FH  ;LOC FOR COUNT-DOWN NUMBER

0807 DB04     CLOOP:   IN     SSTAT    ;LOOK FOR PAPER DETECT
0809 E610              ANI    10H
080B CC4308            CZ     PDOFF    ;TURN OFF PAPER DRIVE IF PAPER
                                       ;IN EXPOSURE POSITION

080E DB06              IN     RCONT    ;LOOK FOR 1 SEC. TIME-OUT
0810 E620              ANI    20H
0812 C20708            JNZ    CLOOP

0815 DB06              IN     RCONT    ;ENABLE RTC ACCESS
0817 F608              ORI    8
0819 D306              OUT    RCONT
081B 00                NOP
081C 3E00              MVI    A,0      ;RESET IRQ FLAG
081E D32D              OUT    CLKCOND
0820 DB06              IN     RCONT    ;DISABLE RTC ACCESS
0822 E6F7              ANI    0F7H
0824 D306              OUT    RCONT

0826 DB02     VWAIT:   IN     VSTAT
0828 E610              ANI    10H      ;WAIT FOR V SYNC
082A CA2608            JZ     VWAIT
082D 0D                DCR    C        ;COUNT DOWN 1
082E 79                MOV    A,C
082F E60F              ANI    0FH
0831 F6B0              ORI    0B0H     ;MAKE ASCII NUMBER
0833 77                MOV    M,A

0834 CDC309            CALL   BEEP

0837 AF                XRA    A        ;POSE TIME UP
0838 B9                CMP    C
0839 C20708            JNZ    CLOOP

083C CD8D07            CALL   ERASE    ;ERASE TEXT

;       FOR DE-BUG PURPOSES
              ;       IN     SSTAT    ;LOOK FOR PAPER DETECT
              ;       ANI    10H
              ;       JNZ    PF1      ;"OUT OF PAPER" ERROR CONDITION

083F CDAA08            CALL   FREEZE   ;FREEZE FRAME
```

```
0842 C9                    RET

0843 DB05      PDOFF:  IN      SCONT    ;TURN OFF PAPER DRIVE MOTOR(S)
0845 F603              ORI     3
0847 D305              OUT     SCONT
0849 C9                RET

;POSE ROUTINE FOR USE IN REGULAR MODE, PHOTOS 2,3,4

084A 3E23      POSE234:MVI     A,23H    ;GO LIVE
084C D300              OUT     VCONT 084E 114A0F            LXI     D,PMESS1 ;POSE MESSAGE
0851 214C41            LXI     H,414CH  ;START OF LINE ON SCREEN
0854 CD6506            CALL    LINEOUT  ;PRINT ON DISPLAY SCREEN
0857 216F41            LXI     H,416FH  ;LOCATION OF COUNTDOWN NUMBER
085A 3E07              MVI     A,7      ;INITIAL COUNTDOWN VALUE
085C CD0A06            CALL    TPRINT   ;NUMERAL OUTPUT ROUTINE
085F 36A0              MVI     M,0A0H   ;BLACK SPACE
0861 11540F            LXI     D,PMESS2 ;THIRD PART OF MESSAGE
0864 218841            LXI     H,4188H  ;START OF THIRD LINE
0867 CD6506            CALL    LINEOUT

086A CD5907            CALL    TON      ;TURN ON TEXT

;SET RTC FOR 1 SECOND PULSES

086D CDED05            CALL    PULSE1
0870 0E07              MVI     C,7      ;COUNTDOWN FROM 7 SEC.
0872 216F41            LXI     H,416FH  ;LOC FOR COUNT-DOWN NUMBER

0875 DB06      RCLOOP: IN      RCONT    ;LOOK FOR 1 SEC. TIME-OUT
0877 E620              ANI     20H
0879 C27508            JNZ     RCLOOP

087C DB06              IN      RCONT    ;ENABLE RTC ACCESS
087E F608              ORI     8
0880 D306              OUT     RCONT
0882 00                NOP
0883 3E00              MVI     A,0      ;RESET IRQ FLAG
0885 D32D              OUT     CLKCOND
0887 DB06              IN      RCONT    ;DISABLE RTC ACCESS
0889 E6F7              ANI     0F7H
088B D306              OUT     RCONT

088D DB02      VW:     IN      VSTAT    ;WAIT FOR V SYNC
088F E610              ANI     10H
0891 CA8D08            JZ      VW 0894 0D                DCR     C        ;COUNT DOWN 1
0895 79                MOV     A,C
0896 E60F              ANI     0FH
0898 F6B0              ORI     0B0H     ;MAKE ASCII NUMBER
089A 77                MOV     M,A
089B CDC309            CALL    BEEP

089E AF                XRA     A        ;POSE TIME UP
089F B9                CMP     C
08A0 C27508            JNZ     RCLOOP

08A3 CD8D07            CALL    ERASE    ;ERASE TEXT
               ;
               ;       OMIT FOR DE-BUG

;       IN      SSTAT    ;LOOK FOR PAPER DETECT
               ;       ANI     10H
               ;       JNZ     PF1      ;"OUT OF PAPER" ERROR CONDITION
               ;

08A6 CDAA08            CALL    FREEZE   ;FREEZE-FRAME

08A9 C9                RET

;FREEZE: PERFORMS FRAME-STORE OF VIDEO
```

```
08AA 3E7D       FREEZE: MVI     A,125D.  ;FULL FRAME MINUS OFFSET
08AC D301               OUT     HBUMP    ;PIXEL SET
08AE CDCF08             CALL    FIELD2   ;LOOKING FOR FIELD 2
08B1 CDC708             CALL    FIELD1   ;LOOKING FOR FIELD 1 TO START FREEZE
08B4 3E22               MVI     A,022H
08B6 D300               OUT     VCONT
08B8 CDCF08             CALL    FIELD2   ;WAIT FOR END OF FIELD 1
08BB CDC708             CALL    FIELD1   ;WAIT FOR END OF FIELD 2 (END OF FRAME)
08BE 3E21               MVI     A,021H
08C0 D300               OUT     VCONT
08C2 3E7F               MVI     A,127    ;RESTORE HBUMP
08C4 D301               OUT     HBUMP
08C6 C9                 RET

08C7 DB02       FIELD1: IN      VSTAT    ;LOOK FOR RA0 LO (FIELD 1)
08C9 E620               ANI     20H
08CB C2C708             JNZ     FIELD1
08CE C9                 RET
08CF DB02       FIELD2: IN      VSTAT    ;LOOK FOR RA0 HI (FIELD 2)
08D1 E620               ANI     20H
08D3 CACF08             JZ      FIELD2
08D6 C9                 RET

;EXPOSURE ROUTINE
08D7 DB02       EXP:    IN      VSTAT    ;LOOK FOR VERT SYNC
08D9 E610               ANI     10H
08DB CAD708             JZ      EXP

08DE AF                 XRA     A
08DF 3E34               MVI     A,MODE0
08E1 D30B               OUT     TCONT
08E3 3E00               MVI     A,0
08E5 D308               OUT     COUNT0   ;COUNTER 0 TO MAX
08E7 3E00               MVI     A,0
08E9 D308               OUT     COUNT0   ;ALMOST (105.MSEC.)
08EB 3E72               MVI     A,114    ;LOAD TIMER 1
08ED D309               OUT     COUNT1   ;FOR 12 SECONDS
08EF 3E00               MVI     A,0
08F1 D309               OUT     COUNT1

08F3 DB00               IN      VCONT    ;EXPOSE
08F5 F608               ORI     8        ;ENABLE EXPOSURE MONITOR
08F7 D300               OUT     VCONT

08F9 E5         BOOGIE: PUSH    H        ;SAVE POINTER
08FA 21500A             LXI     H,TUNE2
08FD CDE109             CALL    PLAY
0900 E1                 POP     H        ;RESTORE POINTER

0901 DB06       EWAIT:  IN      RCONT    ;WAIT FOR TIMEOUT
0903 E610               ANI     10H
0905 CA0109             JZ      EWAIT

0908 DB00               IN      VCONT    ;STOP EXPOSURE
090A E6F7               ANI     0F7H
090C D300               OUT     VCONT

090E C9                 RET

;CUTTER ROUTINE ACTIVATES AND MONITORS PAPER CUTTERS

090F DB05       CUT:    IN      SCONT
0911 F603               ORI     3        ;ENSURE PAPER DRIVES ARE OFF
0913 D305               OUT     SCONT
0915 E6FB               ANI     0FBH     ;START CUTTER MOTOR
0917 D305               OUT     SCONT

0919 DB04       CUT1:   IN      SSTAT    ;LOOK FOR HOME SWITCH TO OPEN
091B E608               ANI     8
091D CA1909             JZ      CUT1

;DELAY TO AVOID SWITCH BOUNCE
```

```
0920 3E34            MVI     A,MODE0
0922 D30B            OUT     TCONT
0924 3E00            MVI     A,0         ;LOAD COUNTER0
0926 D308            OUT     COUNT0
0928 3E04            MVI     A,4
092A D308            OUT     COUNT0
092C 3E01            MVI     A,1         ;LOAD COUNTER1
092E D309            OUT     COUNT1
0930 3E00            MVI     A,0
0932 D309            OUT     COUNT1

0934 DB06    CDEL:   IN      RCONT       ;LOOK FOR 8253 TIME-OUT
0936 E610            ANI     10H
0938 CA3409          JZ      CDEL

093B DB04    CUT2:   IN      SSTAT       ;LOOK FOR HOME SWITCH TO CLOSE AGAIN
093D E608            ANI     8
093F C23B09          JNZ     CUT2
0942 DB05            IN      SCONT       ;TURN OFF CUTTER MOTOR
0944 F604            ORI     4           ;D2 HI
0946 D305            OUT     SCONT

0948 C9              RET 0949 3E34    SKOOCUT:MVI     A,MODE0
094B D30B            OUT     TCONT
094D 3E00            MVI     A,0         ;SKOOTCH PAPER FORWARD AND CUT
094F D308            OUT     COUNT0      ;LOAD COUNTER FOR SKOOTCH
0951 3EE1            MVI     A,225
0953 D308            OUT     COUNT0
0955 3E07            MVI     A,7         ;1.4 INCHES
0957 D309            OUT     COUNT1
0959 3E00            MVI     A,0
095B D309            OUT     COUNT1

095D DB05            IN      SCONT       ;TURN ON P.D.MOTORS
095F E6FC            ANI     0FCH
0961 D305            OUT     SCONT

0963 DB06    SKCWAIT:IN      RCONT       ;WAIT FOR TIMEOUT
0965 E610            ANI     10H
0967 CA6309          JZ      SKCWAIT

096A DB05            IN      SCONT
096C F603            ORI     3           ;TURN OFF P.D. MOTORS
096E D305            OUT     SCONT

0970 CD0F09          CALL    CUT         ;CUT PAPER 0973 3E34            MVI     A,MODE0
0975 D30B            OUT     TCONT
0977 3E00            MVI     A,0
0979 D308            OUT     COUNT0      ;LOAD COUNTER FOR SKOOTCH
097B 3E9E            MVI     A,158
097D D308            OUT     COUNT0
097F 3E03            MVI     A,3         ;.55 INCH
0981 D309            OUT     COUNT1
0983 3E00            MVI     A,0
0985 D309            OUT     COUNT1

0987 DB05            IN      SCONT       ;TURN ON 2ND P.D.MOTOR ONLY
0989 E6FD            ANI     0FDH
098B D305            OUT     SCONT

098D DB06    SKC2:   IN      RCONT       ;WAIT FOR TIMEOUT
098F E610            ANI     10H
0991 CA8D09          JZ      SKC2

0994 DB05            IN      SCONT
0996 F603            ORI     3           ;TURN OFF P.D. MOTORS
0998 D305            OUT     SCONT
```

```
099A C9                   RET 099B 3E34      SKOOTCH:MVI    A,MODE0
099D D30B              OUT    TCONT
099F 3E00              MVI    A,0         ;SKOOTCH PAPER FORWARD 1.1 INCHES
09A1 D308              OUT    COUNT0      ;LOAD COUNTER
09A3 3EFD              MVI    A,253
09A5 D308              OUT    COUNT0
09A7 3E0A              MVI    A,10
09A9 D309              OUT    COUNT1
09AB 3E00              MVI    A,0
09AD D309              OUT    COUNT1

09AF DB05              IN     SCONT       ;TURN ON P.D.MOTORS
09B1 E6FC              ANI    0FCH
09B3 D305              OUT    SCONT

09B5 DB06      SKWAIT: IN     RCONT       ;WAIT FOR TIMEOUT
09B7 E610              ANI    10H
09B9 CAB509            JZ     SKWAIT

09BC DB05              IN     SCONT
09BE F603              ORI    3           ;TURN OFF P.D. MOTORS
09C0 D305              OUT    SCONT

09C2 C9                RET

;BEEP AND AUDIO SUBROUTINES GO HERE

;BEEPER USED IN 7 SECOND COUNT-DOWN

09C3 3E00      BEEP:   MVI    A,00        ;LSB OF BEEP FREQ.
09C5 D30A              OUT    COUNT2
09C7 3E04              MVI    A,04H       ;MSB OF BEEP FREQ (1/1024)
09C9 D30A              OUT    COUNT2
09CB CDD509            CALL   BDEL        ;BEEP FOR 78 MS
09CE CDD509            CALL   BDEL        ;TWICE
09D1 CD320A            CALL   QUIET
09D4 C9                RET

09D5 E5        BDEL:   PUSH   H           ;SAVE HL REG
09D6 210807            LXI    H,1800D     ;INIT DELAY COUNTER
09D9 2B        BD1:    DCX    H
09DA 7D                MOV    A,L
09DB B4                ORA    H           ;ZERO YET?
09DC C2D909            JNZ    BD1
09DF E1                POP    H
09E0 C9                RET

09E1 CDDB05    PLAY:   CALL   PULSE64     ;MAKE SURE RTC IN FAST MODE
09E4 7E                MOV    A,M         ;GET NOTE TO PLAY
09E5 FE25              CPI    '%'         ;END OF TUNE?
09E7 CAFA09            JZ     DONE
09EA D30A              OUT    COUNT2      ;LOAD LSB
09EC 23                INX    H
09ED 7E                MOV    A,M         ;GET MSB
09EE D30A              OUT    COUNT2
09F0 CDFE09            CALL   NOTE        ;PLAY FOR AWHILE
09F3 CDFE09            CALL   NOTE
09F6 23                INX    H           ;POINT TO NEXT NOTE
09F7 C3E109            JMP    PLAY        ;PLAY ANOTHER NOTE
09FA CD320A    DONE:   CALL   QUIET
09FD C9                RET

09FE C5        NOTE:   PUSH   B
09FF 0E05              MVI    C,5         ;78 MS NOTE LENGTH

0A01 DB06              IN     RCONT       ;ENABLE RTC ACCESS
0A03 F608              ORI    8
0A05 D306              OUT    RCONT
0A07 00                NOP
```

```
0A08 3E00              MVI     A,0       ;RESET IRQ FLAG
0A0A D32D              OUT     CLKCOND
0A0C 00                NOP

0A0D DB06              IN      RCONT     ;DISABLE RTC ACCESS
0A0F E6F7              ANI     0F7H
0A11 D306              OUT     RCONT

0A13 DB06      N1:     IN      RCONT     ;LOOK FOR PULSE
0A15 E620              ANI     20H
0A17 C2130A            JNZ     N1

0A1A DB06              IN      RCONT     ;ENABLE RTC ACCESS
0A1C F608              ORI     8
0A1E D306              OUT     RCONT
0A20 00                NOP
0A21 3E00              MVI     A,0       ;RESET IRQ FLAG
0A23 D32D              OUT     CLKCOND
0A25 00                NOP
0A26 DB06              IN      RCONT     ;DISABLE RTC ACCESS
0A28 E6F7              ANI     0F7H
0A2A D306              OUT     RCONT

0A2C 0D                DCR     C         ;COUNT DOWN FROM 5
0A2D C2130A            JNZ     N1
0A30 C1                POP     B
0A31 C9                RET

;QUIET - SUBROUTINE TO TURN OFF SOUND
0A32 3EB6      QUIET:  MVI     A,MODE2  ;SSHHHH
0A34 D30B              OUT     TCONT
0A36 C9                RET

0A37 D430D430D4TUNE1:  DB      212,48,212,48,212,48,212,48,2,0,2,0,21,52,21,52
0A47 C82EC82EBD        DB      200,46,200,46,189,58,189,58,'%'

0A50 D430D43010TUNE2:  DB      212,48,212,48,16,39,16,39,159,36,159,36,119,34,1
0A60 8D208D209F        DB      141,32,141,32,159,36,159,36,16,39,16,39,103,43,1

0A70 D430D43010        DB      212,48,212,48,16,39,16,39,159,36,159,36,119,34,1
0A80 8D208D209F        DB      141,32,141,32,159,36,159,36,16,39,16,39,103,43,1

0A90 D430D43010        DB      212,48,212,48,16,39,16,39,159,36,159,36,119,34,1
0AA0 8D208D209F        DB      141,32,141,32,159,36,159,36,16,39,16,39,103,43,1

0AB0 D430D43002        DB      212,48,212,48,2,0,2,0,106,24,212,48,212,48,2,0,2
0AC2 D430D4306A        DB      212,48,212,48,106,24,212,48,212,48,'%'

0AD0 7722772277TUNE3:  DB      119,34,119,34,119,34,119,34,119,34,119,34,119,34
0ADE D430D430D4        DB      212,48,212,48,212,48,212,48,212,48,212,48
0AED 25                DB      '%'

0AEE 0004000400FRTONE: DB      00,04,00,04,00,08,00,08,'%'

0AF7 C14E027BBTABLE:   DB      0C1H,04EH,060H,027H,0BBH,046H,05DH,023H,031H,040
0B01 1820C33A61        DB      018H,020H,0C3H,03AH,061H,01DH,02DH,036H,016H,01B
0B0B 41322019DD        DB      041H,032H,020H,019H,0DDH,02EH,06EH,017H,0E7H,02B
0B15 F3154A29A5        DB      0F3H,015H,04AH,029H,0A5H,014H,0F9H,026H,07CH,013
0B1F E72473120A        DB      0E7H,024H,073H,012H,00AH,023H,085H,011H,05BH,021
0B29 AD10D41FEA        DB      0ADH,010H,0D4H,01FH,0EAH,00FH,06FH,01EH,037H,00F
0B33 281D940EFB        DB      028H,01DH,094H,00EH,0FBH,01BH,0FDH,00DH,0E5H,01A
0B3D 720DE519F2        DB      072H,00DH,0E5H,019H,0F2H,00CH,0F6H,018H,07BH,00C
0B47 19180C0C4A        DB      019H,018H,00CH,00CH,04AH,017H,0A5H,00BH,088H,016
0B51 440BD315E9        DB      044H,00BH,0D3H,015H,0E9H,00AH,029H,015H,094H,00A
0B5B 8814440AF1        DB      088H,014H,044H,00AH,0F1H,013H,0F8H,009H,063H,013
0B65 B109DC126E        DB      0B1H,009H,0DCH,012H,06EH,009H,05CH,012H,02EH,009
0B6F E311F10870        DB      0E3H,011H,0F1H,008H,070H,011H,0B8H,008H,003H,011
0B79 81089B104D        DB      081H,008H,09BH,010H,04DH,008H,037H,010H,01BH,008
0B83 D90FEC077E        DB      0D9H,00FH,0ECH,007H,07EH,00FH,0BFH,007H,023H,00F
0B8D 9407D50E6A        DB      094H,007H,0D5H,00EH,06AH,007H,085H,00EH,042H,007
```

```
40B97 390E1C07F0      DB      039H,00EH,01CH,007H,0F0H,00DH,0F8H,006H,0AAH,00D
40BA1 D506660DB3      DB      0D5H,006H,066H,00DH,0B3H,006H,025H,00DH,092H,006
40BAB E70C7306AB      DB      0E7H,00CH,073H,006H,0ABH,00CH,055H,006H,070H,00C
40BB5 3806380C1C      DB      038H,006H,038H,00CH,01CH,006H,002H,00CH,001H,006
40BBF CE0BE7059B      DB      0CEH,00BH,0E7H,005H,09BH,00BH,0CDH,005H,06BH,00B
40BC9 B5053B0B9D      DB      0B5H,005H,03BH,00BH,09DH,005H,00EH,00BH,087H,005
40BD3 E10A7005B6      DB      0E1H,00AH,070H,005H,0B6H,00AH,05BH,005H,08DH,00A
40BDD 4605640A32      DB      046H,005H,064H,00AH,032H,005H,03DH,00AH,01EH,005
40BE7 170A0B05F2      DB      017H,00AH,00BH,005H,0F2H,009H,0F9H,004H,0CEH,009
0BF1  E704AB09D5      DB      0E7H,004H,0ABH,009H,0D5H,004H,'%'

0BF8  F70ACD0A50 TDIR    DW      TABLE,TUNE3,TUNE2,TUNE3,FRTONE

;INTERRUPT SERVICE ROUTINES

;8253 TIMER INTERRUPT (7.5) ROUTINES

;THIS IS A SAMPLE INTERRUPT ENABLE ROUTINE
                ;
                ;       MVI     A,1BH   ;CLR OLD INT, AND ENABLE 7.5(TIMER)
                ;       DB      SIM     ;"SIM INSTRUCTION
                ;       EI              ;ENABLE INTERRUPTS
                ;       HLT             ;WAIT FOR INTERRUPT
0C02 F5         TSERVE: PUSH    PSW     ;SAVE CURRENT PSW
0C03 3A0020             LDA     TFLAGS  ;WHEN IS THIS?

0C06 FE01               CPI     1       ;PAPER FEED 1 (THIS IS AN ERROR COND.)
0C08 CA210C             JZ      PF1     ;OUT OF PAPER OR SOME OBSTRUCTION

0C0B FE02               CPI     2       ;PAPER FEED 2 (NORMAL INTER-PHOTO SPACE)
0C0D CA2E0C             JZ      PF2

0C10 FE03               CPI     3       ;GENERAL PURPOSE TIMER
0C12 CA360C             JZ      GPT

0C15 FE04               CPI     4
0C17 CA380C             JZ      SRV     ;SERVICE FLAG

0C1A F1                 POP     PSW     ;NORMALIZE SP
0C1B F1                 POP     PSW
0C1C 3E03               MVI     A,IE7   ;SPURIOUS (UNSIGNED INTERRUPT)
0C1E C3680C             JMP     ERROR   ;NOBODY SENT ME HERE!!!

0C21 DB05       PF1:    IN      SCONT   ;TURN THINGS OFF
0C23 F60F               ORI     0FH
0C25 D305               OUT     SCONT
0C27 F1                 POP     PSW
0C28 F1                 POP     PSW     ;NORMALIZE SP
0C29 3E04               MVI     A,OPERR ;OUT OF PAPER ERROR FLAG
0C2B C3680C             JMP     ERROR

0C2E DB05       PF2:    IN      SCONT   ;TURN OFF PAPER FEED MOTOR
0C30 F603               ORI     3       ;D0 = HI  D1 = HI
0C32 D305               OUT     SCONT
0C34 F1                 POP     PSW
0C35 C9                 RET             ;BACK TO WHERE YANKED FROM

0C36 F1         GPT:    POP     PSW     ;GENERAL PURPOSE TIMER
0C37 C9                 RET             ;BACK TO WHERE YANKED FROM

0C38 3EAA       SRV:    MVI     A,0AAH  ;BEEN HERE FLAG LEFT FOR LOOP
0C3A 320620             STA     BINHEER
0C3D F1                 POP     PSW
0C3E C9                 RET

;REAL TIME CLOCK INTERRUPT (6.5) SERVICE ROUTINES

0C3F F5         RTSERVE:PUSH    PSW     ;SAVE CURRENT PSW
0C40 3A0120             LDA     RTFLAG  ;WHEN IS THIS? (WHERE WAS I?)
```

```
0C43 FE01.                  CPI      1           ;RTC PULSE NORMAL TIME-OUT
0C45 CA480C                 JZ       RT1

0C48 F1          RT1:       POP      PSW         ;RESTORE PSW
0C49 C9                     RET                  ;BACK WHERE YANKED FROM

0C4A F1                     POP      PSW         ;NORMALIZE SP
0C4B F1                     POP      PSW
0C4C 3E02                   MVI      A,IE6       ;SPURIOUS (UNSIGNED INTERRUPT)
0C4E C3680C                 JMP      ERROR       ;NOBODY SENT ME HERE!!!

;BILL ACCEPTOR INTERRUPT (5.5) SERVICE ROUTINES

0C51 F5          BSERVE:    PUSH     PSW         ;SAVE CURRENT PSW
0C52 3A0220                 LDA      BFLAG       ;WHEN IS THIS? (WHERE WAS I?)
0C55 FE01                   CPI      1           ;BILL ACCEPTED
0C57 C2600C                 JNZ      BERR        ;ERRONEOUS INT.

0C5A 310024                 LXI      SP,2400H    ;FORCE STACK POINTER TO CORRECT
                                                 ;VALUE

0C5D C37901                 JMP      START       ;START OPERATIONS

0C60 310024     BERR:       LXI      SP,2400H    ;FORCE STACK POINTER TO CORRECT
                                                 ;VALUE
0C63 3E01                   MVI      A,IE5       ;SPURIOUS (UNSIGNED INTERRUPT)
0C65 C3680C                 JMP      ERROR       ;NOBODY SENT ME HERE!!!

0C68 3E80       ERROR:      MVI      A,80H       ;SIGNAL ERROR
0C6A D305                   OUT      SCONT
0C6C 2F         ER1:        CMA
0C6D D305                   OUT      SCONT
0C6F C36C0C                 JMP      ER1         ;ADD ERROR ROUTINE WHEN I
                                                 ;THINK OF ONE

;SCREEN ROUTINES CENTRAL
                ;MESSAGE AND ATTRACT MODE ROUTINES HERE

0C72 C9         ATLOAD:     RET                  ;WILL WRITE CANNED IMAGE TO SCREEN

0C73 11F70E     SCREEN1:    LXI      D,LOGO1     ;POINT TO LOGO
0C76 212040                 LXI      H,4020H     ;POINT TO TOP LEFT OF SCREEN
0C79 1A         SPEW:       LDAX     D           ;SPEW OUT LOGO TIL SCREEN FILLED
0C7A FE25                   CPI      '%'         ;END OF LOGO?
0C7C C2830C                 JNZ      SP1
0C7F 11F70E                 LXI      D,LOGO1     ;START LOGO AGAIN
0C82 1A                     LDAX     D
0C83 77         SP1:        MOV      M,A         ;PRINT TO SCREEN
0C84 13                     INX      D
0C85 23                     INX      H
0C86 7D                     MOV      A,L         ;END OF SCREEN LINE ?
0C87 E61F                   ANI      1FH
0C89 FE1E                   CPI      1EH
0C8B C2790C                 JNZ      SPEW
0C8E 7D                     MOV      A,L
0C8F FEBE                   CPI      0BEH
0C91 C29A0C                 JNZ      NOBIG
0C94 7C                     MOV      A,H         ;END OF SCREEN TOTALLY ?
0C95 FE41                   CPI      41H
0C97 CAA10C                 JZ       FILLED
0C9A 010200     NOBIG:      LXI      B,2         ;FORCE TO BEGINNING OF NEXT LINE
0C9D 09                     DAD      B           ;BY BUMPING HL BY 2
0C9E C3790C                 JMP      SPEW
0CA1 DB02       FILLED:     IN       TEXCON      ;TURN ON TEXT
0CA3 F601                   ORI      1
0CA5 D302                   OUT      TEXCON
0CA7 0E03                   MVI      C,3         ;CALL   2 SEC DELAY 7 TIMES
0CA9 CD4105     SP2:        CALL     DELAY
0CAC 0D                     DCR      C
0CAD C2A90C                 JNZ      SP2
0CB0 C9                     RET
```

```
0CB1 CD8D07   SCREEN2:CALL    ERASE     ;REMOVES TEXT
0CB4 DB00            IN       VCONT     ;JUST TURNS ON DISPLAY
0CB6 F620            ORI      20H
0CB8 D300            OUT      VCONT

0CBA 216841          LXI      H,4168H
0CBD 11BE0F          LXI      D,STRAIT ;STRAIGHT SHOTS
0CC0 DB02     VWW:   IN       VSTAT    ;WAIT FOR V SYNC
0CC2 E610            ANI      10H
0CC4 CAC00C          JZ       VWW
0CC7 CD6F06          CALL     BLNOUT
0CCA CD5907          CALL     TON
0CCD 0E05            MVI      C,5
0CCF CD4105   ST1:   CALL     DELAY
0CD2 0D             DCR      C
0CD3 C2CF0C          JNZ      ST1

0CD6 CD8D07          CALL     ERASE
0CD9 216E41          LXI      H,416EH
0CDC 11CE0F          LXI      D,STRAIT2 ;OR
0CDF DB02     VWWW:  IN       VSTAT
0CE1 E610            ANI      10H
0CE3 CADF0C          JZ       VWWW
0CE6 CD6F06          CALL     BLNOUT
0CE9 CD5907          CALL     TON
0CEC CD4105          CALL     DELAY

0CEF CD8D07          CALL     ERASE

0CF2 C9             RET

0CF3 3E7F     SCREEN3:MVI     A,127    ;SLURPS IMAGE IN AND OUT
0CF5 D301            OUT      HBUMP
0CF7 21F70A          LXI      H,TABLE

0CFA DB00            IN       VCONT    ;MIRROR DISPLAY
0CFC F604            ORI      4
0CFE D300            OUT      VCONT

0D00 CDDB05          CALL     PULSE64

;SET RTC FOR 1/64 SECOND PULSES

0D03 216A41          LXI      H,416AH
0D06 11D20F          LXI      D,FFACES ;FUNNY FACES
0D09 DB02     FW:    IN       VSTAT    ;WAIT FOR V SYNC
0D0B E610            ANI      10H
0D0D CA090D          JZ       FW
0D10 CD6F06          CALL     BLNOUT
0D13 CD5907          CALL     TON
0D16 CD4105          CALL     DELAY

0D19 21F70A          LXI      H,TABLE  ;POINT TO SLURP-TONES

0D1C DB02     SCRURP: IN      VSTAT    ;LOOK FOR BLANKING (V SYNC, REALLY)
0D1E E610            ANI      10H
0D20 CA1C0D          JZ       SCRURP

0D23 DB01            IN       HBUMP    ;SLURP
0D25 3D             DCR      A
0D26 D301            OUT      HBUMP

;PLAY A TONE THEN IT'S OCTAVE NOTE

0D28 7E              MOV      A,M      ;GET NOTE FROM TABLE (LSB)
0D29 D30A            OUT      COUNT2   ;LOAD SCALE VALUE IN COUNTER
0D2B 23              INX      H        ;MSB OF NOTE VALUE
0D2C 7E              MOV      A,M
0D2D D30A            OUT      COUNT2
0D2F CDFE09          CALL     NOTE     ;PLAY IT
0D32 23              INX      H        ;TO LSBYTE OF NEXT NOTE
```

```
0D33 7E                    MOV     A,M         ;GET NOTE FROM TABLE (LSB)
0D34 D30A                  OUT     COUNT2      ;LOAD SCALE VALUE IN COUNTER
0D36 23                    INX     H           ;MSB OF NOTE VALUE
0D37 7E                    MOV     A,M
0D38 D30A                  OUT     COUNT2
0D3A CDFE09                CALL    NOTE        ;PLAY IT
0D3D 23                    INX     H

0D3E DB01                  IN      HBUMP
0D40 FE60                  CPI     96          ;SLURPED IN ALL THE WAY?
0D42 C21C0D                JNZ     SCRURP      ;IF NOT, REPEAT

0D45 2B                    DCX     H           ;POINT TO MSB OF HI WATER NOTE
                                               ;GETS TABLE POINTER IN PHASE
                                               ;FOR DECREMENT

0D46 DB02     SCROUT:      IN      VSTAT       ;LOOK FOR BLANKING (V SYNC, REALLY)
0D48 E610                  ANI     10H
0D4A CA460D                JZ      SCROUT

0D4D DB01                  IN      HBUMP       ;UNSLURP
0D4F 3C                    INR     A
0D50 D301                  OUT     HBUMP

;PLAY A TONE AND IT'S OCTAVE

0D52 2B                    DCX     H           ;POINT TO LSB OF LAST TONE
0D53 7E                    MOV     A,M         ;GET NOTE FROM TABLE (LSB)
0D54 D30A                  OUT     COUNT2      ;LOAD SCALE VALUE IN COUNTER
0D56 23                    INX     H           ;MSB OF NOTE VALUE
0D57 7E                    MOV     A,M
0D58 D30A                  OUT     COUNT2
0D5A CDFE09                CALL    NOTE        ;PLAY IT

0D5D 2B                    DCX     H           ;POINT TO LSB

0D5E 7E                    MOV     A,M         ;GET NOTE FROM TABLE (LSB)
0D5F D30A                  OUT     COUNT2      ;LOAD SCALE VALUE IN COUNTER
0D61 23                    INX     H           ;MSB OF NOTE VALUE
0D62 7E                    MOV     A,M
0D63 D30A                  OUT     COUNT2
0D65 CDFE09                CALL    NOTE        ;PLAY IT
0D68 2B                    DCX     H           ;BACK UP ONE NOTE (2 BYTES)
0D69 2B                    DCX     H

0D6A DB01                  IN      HBUMP
0D6C FE7F                  CPI     127         ;SLURPED OUT ALL THE WAY?
0D6E C2460D                JNZ     SCROUT      ;IF NOT, REPEAT

0D71 CD320A                CALL    QUIET       ;SSSHHH
0D74 DB00                  IN      VCONT       ;UN-MIRROR
0D76 E6FB                  ANI     0FBH
0D78 D300                  OUT     VCONT

;SET RTC FOR 1 SECOND PULSES

0D7A CDED05                CALL    PULSE1

0D7D C9                    RET

0D7E CD8D07   SCREEN4:     CALL    ERASE
0D81 CD9E07                CALL    BLANK
0D84 11650F                LXI     D,BUCK1     ;PRINTS 'INSERT '
0D87 218C40                LXI     H,408CH     ;
0D8A CD6506                CALL    LINEOUT
0D8D 116D0F                LXI     D,BUCK2     ;PRINT '$1.00'
0D90 21AD40                LXI     H,40ADH
0D93 CD6506                CALL    LINEOUT
0D96 CD5907                CALL    TON

0D99 3E07                  MVI     A,7         ;STAY IN THIS LOOP 7 SEC OR
0D9B 320420                STA     BFCNT       ;TIL BILL INSERTED
```

```
0D9E CDB50D    BFLASH: CALL    BFDEL     ;DELAY 2 SEC.
0DA1 CDD10D            CALL    BARROW
0DA4 CDB50D            CALL    BFDEL     ;DELAY
0DA7 CD3E07            CALL    BLANKA    ;BLANK ARROW
0DAA 3A0420            LDA     BFCNT
0DAD 3D                DCR     A
0DAE 320420            STA     BFCNT     ;20 SEC. UP?
0DB1 C8                RZ                ;RETURN AND DO NEXT ROUTINE
0DB2 C39E0D            JMP     BFLASH

0DB5 3E34      BFDEL:  MVI     A,MODE0
0DB7 D30B              OUT     TCONT
0DB9 3E00              MVI     A,0       ;SET TIMER FOR 1 SECOND
0DBB D308              OUT     COUNT0
0DBD 3E00              MVI     A,0
0DBF D308              OUT     COUNT0
0DC1 3E0A              MVI     A,10
0DC3 D309              OUT     COUNT1
0DC5 3E00              MVI     A,0
0DC7 D309              OUT     COUNT1

0DC9 DB06      BFD1:   IN      RCONT     ;WAIT FOR TIME-OUT
0DCB E610              ANI     10H
0DCD CAC90D            JZ      BFD1
0DD0 C9                RET

0DD1 CD5207    BARROW: CALL    TOFF      ;TURN OFF TEXT
0DD4 214441            LXI     H,4144H   ;START OF LEFT ARROW
0DD7 116907            LXI     D,A1      ;POINT TO FIRST HOR ROW
0DDA 0E04              MVI     C,4       ;FOUR CHAR GRAPH STRING
0DDC CD6007            CALL    GRAPH
0DDF 216441            LXI     H,4164H   ;NEXT ROW
0DE2 116F07            LXI     D,A2
0DE5 0E04              MVI     C,4
0DE7 CD6007            CALL    GRAPH
0DEA 218441            LXI     H,4184H
0DED 117507            LXI     D,A3
0DF0 0E04              MVI     C,4
0DF2 CD6007            CALL    GRAPH
0DF5 DB02              IN      TEXCON    ;TURN ON TEXT
0DF7 F601              ORI     1
0DF9 D302              OUT     TEXCON
0DFB C9                RET

;SAY THANK YOU, THEN RET.

0DFC CD8D07    BYE:    CALL    ERASE
0DFF CD9E07            CALL    BLANK

0E02 11740F            LXI     D,BMESS1  ;SAY THANKS
0E05 216C40            LXI     H,406CH
0E08 CD6506            CALL    LINEOUT

0E0B 117D0F            LXI     D,BMESS2  ;THAT WAS FUN
0E0E 21A940            LXI     H,40A9H
0E11 CD6506            CALL    LINEOUT

0E14 118C0F            LXI     D,BMESS3  ;YOUR PHOTOS...
0E17 21E340            LXI     H,40E3H
0E1A CD6506            CALL    LINEOUT

0E1D 11A70F            LXI     D,BMESS4  ;IN JUST A FEW SECONDS
0E20 212541            LXI     H,4125H
0E23 CD6506            CALL    LINEOUT

0E26 CD5907            CALL    TON       ;TURN TEXT ON
0E29 C9                RET
0E2A 3E07      SERVICE:MVI     A,07H
0E2C D305              OUT     SCONT     ;EVERYTHING OFF BUT HTR
0E2E CD8D07            CALL    ERASE
```

```
0E31 CD9E07            CALL    BLANK
0E34 218240            LXI     H,4082H
0E37 11E00F            LXI     D,SERV1     ;SERVICE MODE
0E3A CD6506            CALL    LINEOUT
0E3D 21C240            LXI     H,40C2H     ;PUSH 'FUNNY FACES' FOR PAPER LOAD
0E40 11FE0F            LXI     D,SERV2
0E43 CD6506            CALL    LINEOUT
0E46 21E240            LXI     H,40E2H
0E49 111C10            LXI     D,SERV3
0E4C CD6506            CALL    LINEOUT

0E4F 212241            LXI     H,4122H     ;PUSH 'REGULAR' FOR NORMAL OPS.
0E52 113A10            LXI     D,SERV4
0E55 CD6506            CALL    LINEOUT

0E58 CD5907            CALL    TON

0E5B DB04     MODE:    IN      SSTAT
0E5D E606              ANI     6           ;LOOK FOR EITHER SWITCH
0E5F FE06              CPI     6
0E61 CA5B0E            JZ      MODE

0E64 E604              ANI     4           ;BACK TO NORMAL?
0E66 CA0000            JZ      0           ;RESET THE WHOLE WORKS

0E69 DB04              IN      SSTAT       ;CUTTER HOME?
0E6B E608              ANI     8
0E6D C40F09            CNZ     CUT         ;IF NOT HOME IT
0E70 CD8D07            CALL    ERASE
0E73 216240            LXI     H,4062H
0E76 115810            LXI     D,PAPERL    ;PAPER LOAD MESS
0E79 CD6506            CALL    LINEOUT

0E7C CD5907            CALL    TON

0E7F DB05              IN      SCONT       ;MOTORS ON
0E81 E6FC              ANI     0FCH
0E83 D305              OUT     SCONT

0E85 DB04     SEWT:    IN      SSTAT       ;LOOK FOR PAPER SWITCH
0E87 E610              ANI     10H
0E89 C2850E            JNZ     SEWT        ;PAPER ARRIVED

0E8C DB05              IN      SCONT       ;STOP MOTORS FOR A SEC
0E8E F603              ORI     3
0E90 D305              OUT     SCONT

;WE'RE AT SWITCH, NOW PUMP OUT ANOTHER 4.75 INCHES THEN CUT

0E92 3E00              MVI     A,0         ;COUNT0 TO MAX
0E94 D308              OUT     COUNT0
0E96 3EF8              MVI     A,248       ;MSB
0E98 D308              OUT     COUNT0
0E9A 3E19              MVI     A,25        ;COUNT1 LSB
0E9C D309              OUT     COUNT1
0E9E 3E00              MVI     A,0         ;MSB
0EA0 D309              OUT     COUNT1

0EA2 DB05              IN      SCONT       ;MOTORS ON
0EA4 E6FC              ANI     0FCH
0EA6 D305              OUT     SCONT

0EA8 DB06     SELOOP:  IN      RCONT
0EAA E610              ANI     10H
0EAC CAA80E            JZ      SELOOP      ;WAIT FOR 4.5 SEC (6.6 IN PAST SWITCH)

0EAF DB05              IN      SCONT
0EB1 F603              ORI     3           ;OFF MOTORS (NOT HTR)
0EB3 E6F7              ANI     0F7H        ;HTR ON
0EB5 D305              OUT     SCONT

0EB7 CD0F09            CALL    CUT
```

;PAPER CUT, NOW MOVE IT OUT WITH MOTOR 2 ONLY FOR 5 SEC.

```
0EBA  3E00              MVI     A,0       ;COUNT0 TO MAX
0EBC  D308              OUT     COUNT0
0EBE  3E00              MVI     A,0       ;MSB
0EC0  D308              OUT     COUNT0
0EC2  3E30              MVI     A,48      ;COUNT1 LSB FOR ABOUT 5 SEC.
0EC4  D309              OUT     COUNT1
0EC6  3E00              MVI     A,0       ;MSB
0EC8  D309              OUT     COUNT1

0ECA  DB05              IN      SCONT     ;TURN ON MOTOR 2
0ECC  E6FD              ANI     0FDH      ;HTR ON TOO
0ECE  D305              OUT     SCONT

0ED0  DB06     PSLOOP:  IN      RCONT
0ED2  E610              ANI     10H
0ED4  CAD00E            JZ      PSLOOP    ;WAIT FOR 5 SEC.

0ED7  DB05              IN      SCONT
0ED9  F603              ORI     3         ;OFF MOTORS (NOT HTR)
0EDB  D305              OUT     SCONT
```

;WAIT 12 SEC FOR PAPER TO CLEAR HTR

```
0EDD  3E00              MVI     A,0       ;COUNT0 TO MAX
0EDF  D308              OUT     COUNT0
0EE1  3E00              MVI     A,0       ;MSB
0EE3  D308              OUT     COUNT0
0EE5  3E73              MVI     A,115     ;COUNT1 LSB FOR ABOUT 12 SEC.
0EE7  D309              OUT     COUNT1
0EE9  3E00              MVI     A,0       ;MSB
0EEB  D309              OUT     COUNT1

0EED  DB06     HSLOOP:  IN      RCONT
0EEF  E610              ANI     10H
0EF1  CAED0E            JZ      HSLOOP    ;WAIT FOR 12 SEC.

0EF4  C32A0E            JMP     SERVICE
```

;MESSAGE CENTRAL
;MESSAGE STRINGS FROM VARIOUS ROUTINES STORED HERE

```
0EF7  4F45444956 LOGO1:  DB     'OEDIVOTOHP %'

0F03  202D205048 STAMP1: DB     ' - PHOTOVIDEO - %'
0F14  4252455745 STAMP2: DB     'BREWER ASSOCIATES %'
0F27  53414E5441 STAMP3: DB     'SANTA CRUZ, CA. USA %'
0F3C  4A554C5920 STAMP4: DB     'JULY 6, 1986 %'

0F4A  4556414820 PMESS1: DB     'EVAH UOY %'
0F54  45534F5020 PMESS2: DB     'ESOP OT SDNOCES %'

0F65  5452455345 BUCK1:  DB     'TRESNI %'
0F6D  30302E3124 BUCK2:  DB     '00.1$ %'

0F74  21534B4E41 BMESS1: DB     '!SKNAHT %'
0F7D  214E554620 BMESS2: DB     '!NUF SAW TAHT %'
0F8C  5944414552 BMESS3: DB     'YDAER EB LLIW SOTOHP RUOY %'
0FA7  53444E4F43 BMESS4: DB     'SDNOCES WEF A TSUJ NI %'
0FBE  53544F4853 STRAIT: DB     'STOHS THGIARTS %'
0FCE  524F2025   STRAIT2:DB     'RO %'
0FD2  2153454341 FFACES: DB     '!SECAF YNNUF %'

0FE0  2020202020 SERV1:  DB     '          EDOM ECIVRES %'
0FFE  2020202020 SERV2:  DB     '          SECAF YNNUF HSUP %'
101C  2020202020 SERV3:  DB     '          REPAP DAOL OT %'
103A  2053504F20 SERV4:  DB     ' SPO LAMRON ROF RALUGER HSUP %'

1058  2020202020 PAPERL: DB     '             WON NI REDAEL DEEF %'
```

```
                ;       RAM     SPACE
2000                    ORG     02000H

2000    TFLAGS  DS      1       ;TIMER INTERRUPT FLAG BYTE
2001    RTFLAG  DS      1       ;REAL TIME CLOCK INT. FLAG
2002    BFLAG   DS      1       ;BILL ACCEPTOR INT. FLAG
2003    PHOCNT  DS      1       ;PHOTO COUNTER
2004    BFCNT   DS      1       ;BILL ARROW FLASH CNTR
2005    FLCNT   DS      1       ;SELECT FLASH CNTR
2006    BINHEER DS      1       ;TIME OUT OCCURRED FLAG
2007    MS0     DS      1       ;PAPER DRIVE ON TIMES
2008    LS1     DS      1

;TEMPORARY DATE STORAGE

2009    TM      DS      1       ;TENS OF MONTHS
200A    MM      DS      1       ;MONTHS
200B    TD      DS      1       ;TENS OF DAYS
200C    DD      DS      1       ;DAY OF MONTH
200D    TY      DS      1       ;TENS OF YEARS
200E    Y       DS      1       ;YEAR

2380            ORG     2400H-128
2380    STK     DS      128

2400            END
```

What is claimed is:

1. An apparatus for making photographs from a video image of a user, comprising:

video means for creating an analog video image signal of the user comprising video image data;

computer means for receiving the analog video image signal from the video means, digitizing the video image signal, converting the digital video image signal to a second analog signal, the computer means including a frame buffer means for receiving the digitized video image signal, storing the digitized video image signal and sending the second analog signal, a video control for addressing the digitized video signal in the frame buffer means with address values and means for manipulating the stored video image data and for producing a distorted image of the user by manipulating the stored digitized image data in the frame buffer means by replacing the address values of one half of the data in the frame buffer means with the other half of the address values of the data in the frame buffer means in inverse order to produce a mirror image; and photographic means for receiving the second analog signal from the computer means and creating a photograph from the second analog signal.

2. An apparatus as set forth in claim 1, wherein the video control includes the means for manipulating.

3. An apparatus as set forth in claim 2, wherein the video control includes an arithmetic logic unit (ALU) and wherein further manipulation is accomplished by the ALU subtracting a quantity q from each video address value.

4. An apparatus as set forth in claim 3, wherein the quantity q is known and remains constant.

5. An apparatus as set forth in claim 3, wherein the quantity q varies randomly.

6. An apparatus as set forth in claim 3, wherein the quantity q varies according to a known algorithm.

7. An apparatus for making photographs from a video image of a user, comprising:

video means for creating an analog video signal of the user comprising video data;

computer means for receiving the analog video signal from the video means, digitizing the video signal, converting the digital video image signal to a second analog signal, the computer means including a frame buffer means for receiving the digitized video signal, storing the digitized video signal and sending the second analog signal, a video control for addressing the digitized video signal data in the frame buffer means, the video control addressing the digitized video signal in the frame buffer means with 7 horizontal and 9 vertical address lines and wherein a center line divides each horizontal scan into left and right hand half horizontal values and as the right hand half horizontal values are read out of the frame buffer means they are replaced by their inversely corresponding left hand half horizontal values and means for manipulating the stored video image data and for producing a distorted image of the user by manipulating the stored digitized image data in the frame buffer means; and photographic means for receiving the second analog signal from the computer means and creating a photograph from the received analog signal.

8. An apparatus as set forth in claim 7, wherein the computer means includes a circuit for reading out the right hand half horizontal address values in reverse order for preserving the symmetry of the video image.

9. An apparatus as set forth in claim 8, wherein the video control includes an ALU and the stored digitized image data is further manipulated by the ALU subtracting a quantity q from each horizontal address line.

10. An apparatus as set forth in claim 9, wherein the quantity q is known and is constant.

11. An apparatus as set forth in claim 9, wherein the quantity q is randomly selected.

12. An apparatus as set forth in claim 9, wherein the quantity q is selected by a known algorithm.

13. An apparatus as set forth in claim 3 or 9, wherein the right hand values are defined as negative address values and the video control detects all negative address values and clamps the negative address values to zero.

14. An apparatus as set forth in claim 13, wherein the subtraction operation is repeated for creating successively more distorted photographs.

15. An apparatus as set forth in claim 1 wherein the video means includes a video camera for creating the video image signal and a display monitor for communicating with the user.

16. An apparatus as set forth in claim 15, wherein the video means includes a beamsplitter means for creating two identical image signals and for sending one image signals to the computer means for sending the other image signal to the display monitor for viewing by the user.

17. An apparatus as set forth in claim 16, wherein the computer means includes a system control for writing text on the display monitor, thereby communicating with the user.

18. An apparatus as set forth in claim 16, wherein the computer means includes a video control for sending the stored video image to the display monitor for viewing by the user.

19. An apparatus as set forth in claim 1, wherein the computer means includes means for inverting the video image signal.

20. An apparatus as set forth in claim 1, wherein the photographic means includes an exposure monitor aligned with photo-sensitive paper.

21. An apparatus as set forth in claim 20, wherein the exposure monitor comprises a black and white CRT.

22. An apparatus as set forth in claim 21, wherein the photographic means includes paper feeding means for advancing the photo-sensitive paper for the next photograph.

23. An apparatus as set forth in claim 20, wherein the computer means includes a system control for signaling the paper feeding means and controlling the timing of the paper advance.

24. An apparatus as set forth in claim 23, wherein the photographic means includes means for cutting the photo-sensitive paper.

25. An apparatus as set forth in claim 24, wherein the system control signals the paper cutting means and controls the timing of each paper cut.

26. An apparatus as set forth in claim 23, wherein the photographic means includes a thermal processor for making a positive print from a negative.

27. An apparatus as set forth in claim 20, wherein the photographic means includes means for delivering the photograph to the user.

28. An apparatus as set forth in claim 27, wherein the system control signals the delivery means and controls the delivery of the photograph to the user.

29. An apparatus as set forth in claim 1, wherein the apparatus includes administrative means for activating the apparatus.

30. An apparatus as set forth in claim 29, wherein the administrative means includes a means for accepting coins and for signaling the computer means of the acceptance of the coins at a predetermined amount.

31. An apparatus as set forth in claim 30, wherein the computer means includes means for activating the apparatus upon a signal from the coin acceptance means that sufficient coins have been deposited.

32. An apparatus as set forth in claim 29, wherein the administrative means includes switch means for selecting a normal mode which produces a straight photograph or a humorous mode which manipulates the video image and produces a distorted photograph.

33. An apparatus as set forth in claim 1, wherein the apparatus includes sound means for entertaining and signaling the user.

34. An apparatus as set forth in claim 33, wherein the computer means includes a system control for controlling the operation of the sound means.

35. An apparatus as set forth in claim 34, wherein the sound means includes an amplifier and a speaker.

36. An apparatus as set forth in claim 1, wherein the apparatus is contained in a free standing booth.

37. An apparatus as set forth in claim 36, wherein the booth includes lighting means for setting the proper lighting conditions to maximize the quality of the video image.

38. An apparatus as set forth in claim 37, wherein the computer means includes a system control for controlling the intensity of light from the lighting means.

39. An apparatus as set forth in claim 1 wherein the apparatus produces only black and white photographs.

40. An apparatus as set forth in claim 1, wherein the computer means includes:
an ADC for receiving the video image data from the video means and for digitizing the analog video image signal;
the video control for addressing the video image data stored in the frame buffer means by assigning address values, for manipulating the values of the address values, for controlling the video means and for generating communications with the user on the video means;
a DAC means for converting a digital output signal of the frame buffer means to the second analog signal and for sending the second analog signal to the video means and the photographic means;
a system control for controlling the photographic means; and a CPU for storing an operating program and for temporary data storage for storing program execution.

41. An apparatus as set forth in claim 40, wherein the frame buffer means communicates with the CPU for enabling the CPU to evaluate the video image signal.

* * * * *